United States Patent
Zhang

(10) Patent No.: US 12,425,473 B2
(45) Date of Patent: Sep. 23, 2025

(54) SERVICE REQUEST ALLOCATION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Cheng Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 436 days.

(21) Appl. No.: 17/964,765

(22) Filed: Oct. 12, 2022

(65) Prior Publication Data

US 2023/0093389 A1 Mar. 23, 2023

Related U.S. Application Data

(63) Continuation of application No. PCT/CN2021/114001, filed on Aug. 23, 2021.

(30) Foreign Application Priority Data

Sep. 27, 2020 (CN) .......................... 202011030599.5

(51) Int. Cl.
*H04L 67/1008* (2022.01)
*G06F 9/50* (2006.01)
(Continued)

(52) U.S. Cl.
CPC .......... *H04L 67/1008* (2013.01); *H04L 67/60* (2022.05)

(58) Field of Classification Search
CPC ..................... H04L 67/1008; H04L 67/60
See application file for complete search history.

(56) References Cited

U.S. PATENT DOCUMENTS

| | | | |
|---|---|---|---|
| 2013/0212257 A1* | 8/2013 | Murase | H04L 41/0631 709/224 |
| 2014/0047264 A1* | 2/2014 | Wang | G06F 11/143 714/4.11 |

(Continued)

FOREIGN PATENT DOCUMENTS

| | | |
|---|---|---|
| CN | 102611735 A | 7/2012 |
| CN | 110430278 A | 11/2019 |

(Continued)

OTHER PUBLICATIONS

The World Intellectual Property Organization (WIPO) International Search Report for PCT/CN2021/114001 Nov. 23, 2021 6 Pages (including translation).

*Primary Examiner* — Oleg Survillo
(74) *Attorney, Agent, or Firm* — ANOVA LAW GROUP, PLLC

(57) ABSTRACT

A service request allocation method is provided, performed by a computer device, the method including receiving a service request that needs to be processed; dividing a service device set into a plurality of service device subsets, the plurality of service device subsets being grouped based on an idle resource of each service device in the service device set; determining a target service device subset that matches the service request according to an allocation weight corresponding to each service device subset; selecting a target service device from the target service device subset; and allocating the service request to the target service device, the target service device being configured to perform a service corresponding to the allocated service request.

20 Claims, 7 Drawing Sheets

(51) Int. Cl.
*H04L 67/1004* (2022.01)
*H04L 67/1012* (2022.01)
*H04L 67/60* (2022.01)

(56) References Cited

U.S. PATENT DOCUMENTS

2014/0129715 A1\* 5/2014 Mortazavi ............. G06F 9/5083
　　　　　　　　　　　　　　　　　　　　　　709/226
2017/0251064 A1　 8/2017 Xie et al.
2021/0084100 A1\* 3/2021 Zhang ..................... H04L 67/63
2021/0157644 A1\* 5/2021 Unnikrishnan ........ G06F 9/5072
2022/0318071 A1\* 10/2022 Zhong ................. H04L 67/1004

FOREIGN PATENT DOCUMENTS

| CN | 110858161 A | 3/2020 |
| CN | 112131006 A | 12/2020 |

\* cited by examiner

SERVICE REQUEST ALLOCATION METHOD AND APPARATUS, COMPUTER DEVICE, AND STORAGE MEDIUM

RELATED APPLICATIONS

This application is a continuation of PCT Application No. PCT/CN2021/114001, filed on Aug. 23, 2021, which in turn claims priority to Chinese Patent Application No. 202011030599.5, entitled "SERVICE REQUEST ALLOCATION METHOD AND APPARATUS, COMPUTER DEVICE, AND STORAGE MEDIUM" filed with the China National Intellectual Property Administration on Sep. 27, 2020. The two applications are incorporated herein by reference in their entirety.

FIELD OF THE TECHNOLOGY

This application relates to the field of computer information technologies, and in particular, to a service request allocation method and apparatus, a computer device, and a storage medium.

BACKGROUND OF THE DISCLOSURE

With the development of computer technology, a service device set that provides services often needs to handle a large number of service requests. In order to avoid unresponsiveness due to a large load on a service device (such as a server) in the service device set, it is often necessary to reasonably allocate service requests to different service devices, to achieve basic load balancing among the service devices.

However, there are multiple service request allocation methods, such as allocating service requests to different service devices in a polling manner, or allocating service requests to a service device with a minimum load.

However, in these service request allocation methods, each time the allocation of service requests is executed, load information of each service device in the service device set needs to be counted in real time, and the load information needs to be updated once, to implement load balancing. In this situation, a large number of calculations are often required in real time, and there is a problem of low efficiency in service request allocation.

SUMMARY

Embodiments of this application provide a service request allocation method and apparatus, a computer device, and a storage medium.

One aspect of the present application provides a service request allocation method. The method includes receiving a service request that needs to be processed; dividing a service device set into a plurality of service device subsets, the plurality of service device subsets being grouped based on an idle resource of each service device in the service device set; determining a target service device subset that matches the service request according to an allocation weight corresponding to each service device subset; selecting a target service device from the target service device subset; and allocating the service request to the target service device, the target service device being configured to perform a service corresponding to the allocated service request.

A computer device is provided, including a memory and one or more processors. The memory stores computer-readable instructions, and the computer-readable instructions, when executed by the one or more processors, causes the one or more processors to a service request allocation method. The method includes receiving a service request that needs to be processed; dividing a service device set into a plurality of service device subsets, the plurality of service device subsets being grouped based on an idle resource of each service device in the service device set; determining a target service device subset that matches the service request according to an allocation weight corresponding to each service device subset; selecting a target service device from the target service device subset; and allocating the service request to the target service device, the target service device being configured to perform a service corresponding to the allocated service request.

One or more non-transitory readable storage mediums storing computer-readable instructions are provided. The computer-readable instructions, when executed by one or more processors, cause the one or more processors to perform the service request allocation method described in this application.

DESCRIPTION OF EMBODIMENTS

Figure 1:
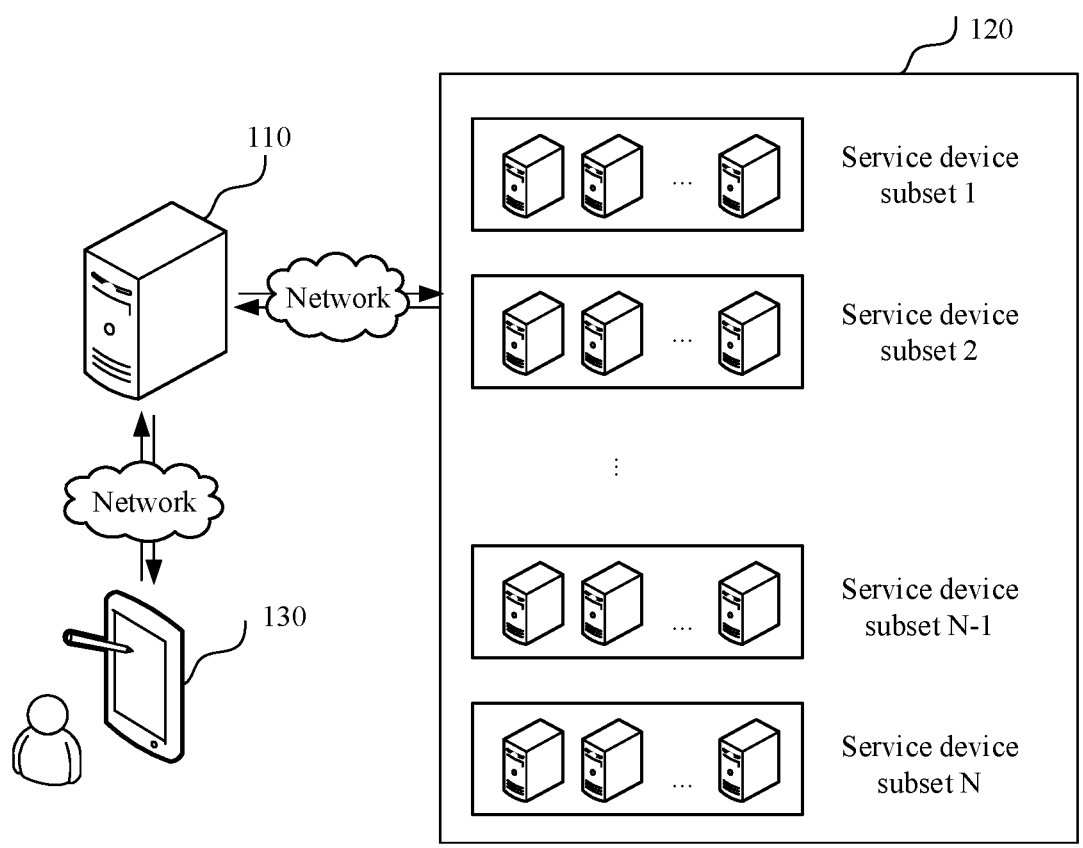
FIG. 1 is a diagram of an application environment of a service request allocation method in an embodiment.

A service request allocation method provided in this application may be applied to an application environment shown in FIG. 1. A computer device 110 respectively communicates with a terminal 130 and a service device set 120 through a network. The service device set 120 includes more than one service device subsets, and each service device subset includes one or more service devices. In some embodiments, the computer device 110 acquires a service request sent by the terminal 130, determines a target service device that matches the service request in the service device set 120, and then allocates the service request to the corresponding target service device through the network, so that the target service device performs service processing on the allocated service request.

In some embodiments, the computer device may be a terminal or server that implements a routing function, such as a routing device, an allocation device, or a central server. The service device may be implemented by using an independent server or a server cluster including a plurality of servers. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal 130 and the computer device 110 may be directly or indirectly connected through wired or wireless communication, and the computer device 110 and the service device set may be directly or indirectly connected through wired or wireless communication, which are not limited in this application.

Figure 2:
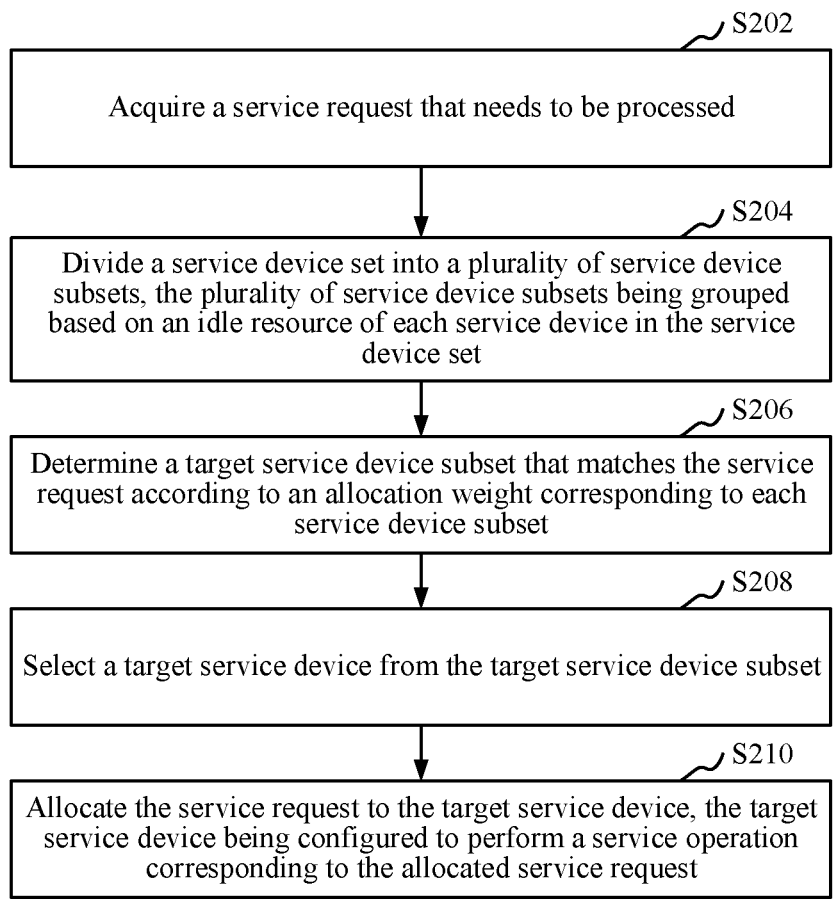
FIG. 2 is a schematic flowchart of a service request allocation method in an embodiment.

In an embodiment, as shown in FIG. 2, a schematic flowchart of a service request allocation method is provided. The description is provided using an example in which the method is applied to the computer device 110 in FIG. 1. The service request allocation method includes the following steps:

Step S202: Acquire a service request that needs to be processed.

The service request may be a communication connection request, a service processing request, or the like. The type of the service request may be different or the same in different service scenarios, which is not limited in this application. A sender of the service request may be a user side or a computer device side, that is, the service request may be a request sent by the user side to the computer device, or may be a request automatically generated in the computer device. The computer device may be a physical server or a virtual server, and may be a gateway route, which is not limited in this application.

In some embodiments, when the service request is a request sent by the user side, the user side having a service processing request may send a service request that needs to be processed to the computer device in real time. Alternatively, a timing task may be preset at the user side, and when the preset time is reached, the user side periodically sends the service request to the computing device. When the service request is a request generated in the computer device, the timing task may be preset in the computer device, and when a time corresponding to the timing task is reached, a service request that needs to be processed is automatically generated in the computer device. When receiving the service request that needs to be processed, the computer device processes the service request according to preset processing logic corresponding to the service request.

In an embodiment, the description is provided using an example in which the service request is sent to the computer device by the user side, and the service request corresponds to a communication connection request. The user side sends the communication connection request. When the computer device receives the communication connection request sent by the user side, the computer device matches a target service device for the communication connection request in a service device cluster consisting of a plurality of service devices, and allocates the communication connection request to the corresponding target service device, to instruct the target service device to perform a service process on the allocated communication connection request.

Step S204: Determine a plurality of service device subsets obtained by dividing a service device set, the plurality of service device subsets being obtained by grouping services devices based on an idle resource of each service device in the service device set.

The service device set includes more than one service device, and in a specific service scenario, the plurality of service devices cooperate to complete a work task corresponding to a service request. The service devices may be different types of devices. For example, the service devices may be FTP servers, web servers, enterprise core application servers, and other main task servers, which is not limited herein. Moreover, in specific applications, the service request allocation method provided in this application may support and schedule the service devices in different types and with different processing capabilities to simultaneously serve, and can deploy each service device in a distributed manner and add or delete a service device according to specific service needs, which has strong scalability, thereby improving the applicability to service scenarios and improving the efficiency of service processing.

The service device subset is obtained by dividing the plurality of service devices in the service device set into groups according to a certain division rule. There is a plurality of service device subsets, where "plurality of" may be understood as more than one. In addition, each service device subset includes one or more service devices. The terms "multiple" and "plurality of" mentioned in the embodiments of this application means "more than one". The idle resource is a performance indicator used to measure the quantity of services that the service device can further load. In some embodiments, when there are more idle resources corresponding to the service device, it can be considered that the service device can further load more services. The performance indicator used to measure the idle resource of the service device may include network bandwidth, a quantity of virtual rooms, a quantity of accessible users, and the like.

It may be understood that in this application, the idle resource of the service device may be measured through one performance indicator alone, or through a plurality of performance indicators comprehensively. In an embodiment, the idle resource of the service device may be measured by using network bandwidth alone, using the quantity of virtual rooms alone, or using the quantity of accessible users alone. In an embodiment, alternatively, the idle resource and the like of the service device may be measured by using a comprehensive value of the network bandwidth, the quantity of virtual rooms, and the quantity of accessible users, which is not limited herein. It may be understood that when the service device has more available (unoccupied) network bandwidth, more virtual rooms that are allowed to be connected to, or more accessible users, it indicates that the service device has more idle resources.

In an embodiment, the division rule for dividing the service devices in the service device set into groups includes dividing into groups according to the idle resource of each service device. For example, the service devices with a similar idle resource can be divided into a same group, so that the service devices belonging to the same group form a service device subset. Accordingly, the idle resources of the service devices in the same service device subset are substantially the same or a difference therebetween is within a certain range, that is, the service devices belonging to the same service device subset have similar (almost at the same level) service processing capabilities. Alternatively, before dividing the service devices into groups, service devices whose idle resource is less than a preset value may be selected, and the service devices are regarded as devices in which a current load pressure is respectively high, and the service devices do not participate in the group division and the subsequent step of receiving the service request, to prevent the service device in which the current load pressure is respectively high from being down due to excessive load. In an embodiment, alternatively, the service devices with a high current load pressure may be divided into a same group, and the service devices in this group do not receive new service requests.

In some embodiments, the step of dividing the service devices into groups to obtain a plurality of service device subsets may be determined after the computer device acquires a service request in step S202, or may be determined before the computer device acquires a service request in step S202, which is not limited in this application.

In an embodiment, the step after the computer device acquires a service request in step S202 further includes obtaining a plurality of service device subsets by dividing the service devices into groups. In some embodiments, when the computer device acquires the service request that needs to be processed, the computer device counts the idle resource corresponding to each service device in the service device set in real time, and divides the service devices into groups according to the magnitude of the idle resource, to obtain a plurality of service device subsets.

In an embodiment, the step before the computer device acquires the service request in step S202 further includes obtaining a plurality of service device subsets by dividing the service devices into groups. In some embodiments, the computer device counts the idle resource corresponding to each service device in the service device set, and divides the service devices into groups according to the magnitude of the idle resource, to obtain and store a plurality of service device subsets. When the computer device acquires the service request that needs to be processed, the computer device directly acquires the plurality of service device subsets pre-stored. It may be understood that the computer device may perform the division of the service device subset at a fixed time point, such as performing the step of dividing the service device subset respectively at midnight and 3 a.m. every day. The computer device may alternatively predetermine a time period, and then perform the step of dividing the service devices into groups for each time period. For example, the computer device may perform the step of dividing the service devices into groups every 5 seconds. This is not limited in this application.

Step S206: Determine a target service device subset that matches the service request according to an allocation weight corresponding to each service device subset.

The allocation weight is a relative value used to measure the capability of each service device subset in the service device set to further load tasks. In some embodiments, the allocation weight may correspond to a specific value. Generally, when the value corresponding to the allocation weight is greater, it indicates that there are more idle resources corresponding to the service device subset, that is, the current load rate of the service device subset is relatively small, and the executable capability of the service device at the current time is stronger.

In some embodiments, the computer device calculates a total idle resource according to the idle resource corresponding to each service device in the service device set, then calculates a subset idle resource corresponding to the service device of each service device subset, and determines an allocation weight corresponding to each service device subset according to a relative value of each subset idle resource and the total idle resource. The relative value may be a ratio of each subset idle resource to the total idle resource, a difference between each subset idle resource and the total idle resource, or the like, which is not limited herein. It may be understood that when the relative value is greater, it indicates that a proportion of the service device subset in the service device set is greater, and the load capability of the service device subset is stronger.

In some embodiments, the computer device extracts a subset from the service device subsets according to the allocation weight corresponding to each service device subset, determines the subset as a target service device subset, and allocates the service request that needs to be processed currently acquired to the target service device subset. The ratio of the quantity of service requests allocated to each service device subset is consistent with the ratio of the allocation weight corresponding to each service device within a time period (that is, within a period in which the allocation weight of each service device subset is fixed and constant), which implements the purpose of allocating the service request to each service device subset evenly within a time period, and implements load balancing of the service device subset.

Step S208: Select a target service device from the target service device subset.

Because the target service device subset includes more than one service device, after the computer device matches the corresponding target service device subset for the service request, the method further includes: selecting a service device from the target service device subset again, and using the screened service device as a target service device to process the service request that needs to be processed acquired this time.

The computer device may select the target service device from the target service device subset using various methods, such as a polling screening algorithm, a selection algorithm in an idle resource principle, and a random screening algorithm, which is not specifically limited in this application.

In an embodiment, a step in which the computer device screens the target service device from the target service device subset according to the polling screening algorithm includes the following steps: Firstly, the computer device queues the service devices according to the idle resource corresponding to each service device in the target service device subset, and determines a queuing order of each service device. Then, the computer device extracts, using the queuing order as a polling order, the service device to which the service request is polled this time as the target service device, and uses the target service device to perform the service processing for the service request.

In an embodiment, a step in which the computer device screens the target service device from the target service device subset according to the screening algorithm in an idle resource principle includes the following steps: The computer device determines the idle resource corresponding to each service device in the target service device subset, and then screens the service device with a largest idle resource as the target service device.

In an embodiment, a step in which the computer device screens the target service device from the target service device subset according to the random screening algorithm includes the following steps: The computer device randomly selects a service device from the target service device subset, and determines the service device randomly selected as the target service device. In other embodiments of this application, the target service device may alternatively be screened from the target service device subset according to other algorithms, which is not limited herein.

Step S210: Allocate the service request to the target service device, the target service device being configured to perform a service operation corresponding to the allocated service request.

In some embodiments, after matching the target service device corresponding to the service request that needs to be processed, the computer device allocates the service request that needs to be processed to the corresponding target service device, to indicate the target service device to perform a corresponding service operation on the allocated service request. The service operation corresponds to the type of the service request. When the type of the service request is a communication connection request, the corresponding service operation is a communication connection operation, and when the type of the service request is a service processing request, the corresponding service operation is a service processing operation.

In a specific embodiment, the computer device acquires the idle resource of all the service devices in the service device set within a corresponding time period, and then divides the service devices into groups according to the idle resource, to obtain the plurality of service device subsets. And the computer device determines the allocation weight corresponding to each service device subset within the current time period according to the idle resource corresponding to the service device included in each service device subset. Within the current time period (within current 5 seconds), the computer device allocates the corresponding quantity of service requests to the corresponding service device subset according to the allocation weight corresponding to each service device subset, to ensure load balancing of each service device subset within the time period. Then, a target service device is screened from the target service device subset according to the preset rule, the service request is reallocated to the target service device, and the service request is processed using the target service device. In this embodiment, because the allocation weight of each service device subset represents the load capability of the service device subset, that the corresponding quantity of service requests are allocated to the corresponding service device subset according to the allocation weight of each service device implements the balance of resource allocation among the service device subsets in the service device set, and avoids the situation that due to the uneven allocation of the service requests, the service device subset is overloaded, and accordingly the downtime of the service device in the service device subset and other disadvantages occur. It may be understood that in the next time period, the computer device needs to re-count the latest idle resource of each service device in the service device set, and reperform the division of the service device subset and recalculate the allocation weight of each service device subset according to the latest idle resource. Then, when the service device receives the service request, the computer device performs a step of redetermining the target service device subset and the target service device according to the latest allocation weight.

Accordingly, the service devices with a similar idle resource are put into the same service device subset, and the allocation weight corresponding to each service device subset is determined. The service request is allocated to the target service device subset according to the allocation weight. Then, the target service device is screened from the target service device subset, and the service request is allocated to the target service device. The service devices with a similar idle resource are put into the same service device subset, allocation is performed according to the allocation weight among different service device subsets, and polling allocation is performed in the same service device subset. Accordingly, the calculation amount of the algorithm is reduced, that the allocation probabilities of the service device subsets with different allocation weights are different is implemented at the same time, and reasonable allocation of the service request and load balancing of the service device are achieved.

The service request allocation method determines the plurality of service device subsets obtained by dividing the service device set, the plurality of service device subsets being obtained by dividing service devices based on the idle resource of more than one service devices in the service device set, so that each service device subset includes one or more service devices with a similar load condition. When the service request that needs to be processed is acquired, the target service device subset that matches the service request may be determined according to the allocation weight corresponding to each service device subset. Then, the service request may be allocated to the target service device in the target service device subset, to perform the corresponding service operation. Because the target service device subset includes the plurality of service devices, the quantity of service device subsets is much less than the quantity of service devices. By allocating the service request to the target service device subset first rather than directly to a specific service device, the calculation amount in the allocation process is reduced, and the efficiency of allocating the service request is improved. In addition, by allocating the service request to the corresponding target service device subset according to the allocation weight corresponding to each service device subset, reasonable allocation for the service request is implemented, thereby satisfying load balancing among the service device subsets. Accordingly, firstly, the service request is allocated to the target service device subset from a coarse-grained level with a direction of load balancing. Then, the service request is allocated to a target service device in the target service device subset. Accordingly, load balancing when the service request is allocated can be satisfied, and there is no need to perform a large quantity of load update calculations in real time, thereby greatly reducing the calculation amount and greatly improving the efficiency of allocating the service request.

Figure 3:
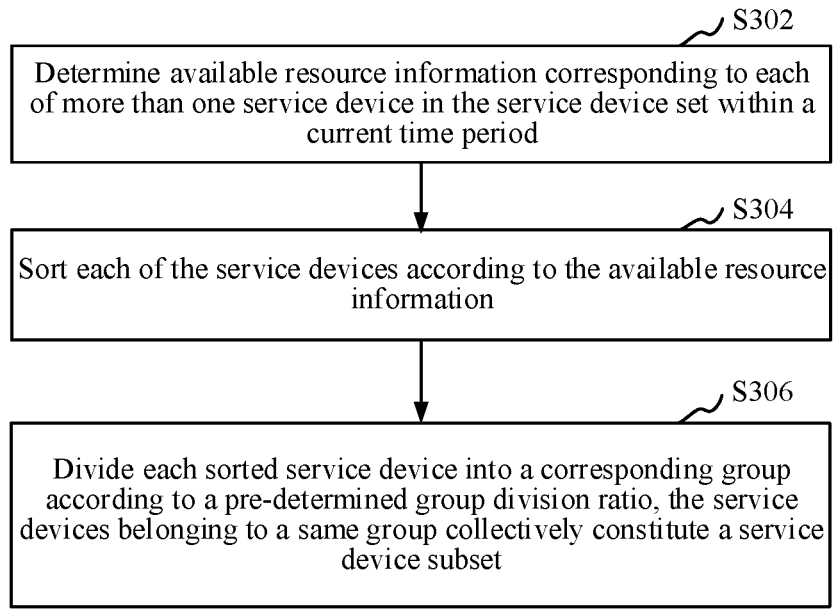
FIG. 3 is a schematic flowchart of a step of dividing a service device set into a plurality of service device subsets in an embodiment.

Referring to FIG. 3, in an embodiment, step S204, that is, the step of dividing a service device set into a plurality of service device subsets, the plurality of service device subsets being grouped based on an idle resource of each service device in the service device set, specifically includes:

Step S302: Determine available resource information corresponding to each of more than one service device in the service device set within a current time period.

The current time period is a period determined according to a predefined time interval. For example, the time interval may be predefined to be 5 seconds, and accordingly the current time period is a time interval of current 5-seconds correspondingly. That is, the time range of every 5 seconds is regarded as a time period, and within a time period, available resource information of each service device in the service device set is counted and updated once, and the service devices are sorted according to the latest updated available resource information. The available resource information is information that measures the current load level or the current resource idle level, and, the available resource information may be a load rate, a resource idle rate, an idle resource, or the like.

In an embodiment, the computer device may calculate the available resource information corresponding to each service device according to a comparison value between current idle resource information and valid resource information. The current idle resource information is quantitative information obtained by quantifying the current idle resource of the service device, and may be a quantitative value specifically. The valid resource information is quantitative information obtained by quantifying a valid resource, and may be a quantitative value specifically. The computer device may use the comparison value between the current idle resource information and the valid resource information as the available resource information corresponding to the service device. The comparison value is a difference between two values, and may be a quotient of the current idle resource information and the valid resource information specifically.

In another embodiment, the computer device may directly use the current idle resource information of the service device as the available resource information.

Step S304: Sort each of the service devices according to the available resource information.

In some embodiments, the computer device sorts the service devices in descending order or ascending order according to the magnitude of the available resource information corresponding to each service device in the service device set.

Step S306: Divide each sorted service device into a corresponding group according to a pre-determined group division ratio, the service devices belonging to a same group collectively constitute a service device subset.

The group division ratio is a predetermined ratio value for dividing the service device set into different groups. The service devices are sorted according to the available resource information corresponding to each service device, and the group division ratio is determined according to a sorting value corresponding to each service device. In different service scenarios, the group division ratio is not a fixed value, and may be adaptively adjusted according to the specific service needs.

In some embodiments, the computer device pre-determines a quantity of service devices included in each service device subset, and determines the group division ratio according to the corresponding quantity of each service device subset. In an embodiment, a total quantity of service devices in the service device set is 24, a quantity of service device subsets is predetermined to be 5, quantities of service devices in each service device subset are predetermined to be 2, 4, 6, 4, 8 respectively, and accordingly, the corresponding group division ratio is 1:2:3:2:4. In one embodiment, the computer device sorts the service devices according to the available resource information corresponding to each service device, and different service device subsets are divided according to the proportion of 1:2:3:2:4 from the sorted service device, to obtain the plurality of service device subsets.

In some embodiments, the group division ratio may alternatively be determined based on a grading level ratio. In an embodiment, the computer device sorts the service devices according to the available resource information corresponding to each service device, and then divides the service devices into groups according to a predetermined grading level ratio. For example, the service devices sorted from 0% to 10% are divided into a first grade G1 to generate a service device subset in first grade, the service devices sorted from 10% to 25% are divided into a second grade G2 to generate a service device subset in second grade, the service devices sorted from 25% to 50% are divided into a third grade G3 to generate a service device subset in third grade, and the service devices sorted from 50% to 85% are divided into a fourth grade G4 to generate a service device subset in fourth grade. Further, the service devices sorted from 85% to 100% may be divided into a fifth grade G5 to generate a service device subset in fifth grade. In other embodiments, because the available resource information of the service devices sorted from 85% to 100% is relatively small, that is, the current load rate of the service devices is very high, and the capability of further loading the service is relatively weak, in the process of performing group division, the service devices can be discarded or divided into a group that does not participate in receiving service requests. Accordingly, it is ensured that the service device with a high load does not receive new service requests again, and ensured that the service device with a high load is not down due to excessive load caused by receiving too many service requests.

In some embodiments, in the current time period, the service devices are divided into groups according to the available resource information of each service device to obtain the plurality of service device subsets, and the allocation weight corresponding to each service device subset is determined at the same time. Then, all the service requests received within the time period are allocated according to the allocation weight determined within the current time period. After the allocation of the service request in the current time period is completed, the computer device is started to re-count the available resource information of each service device in the next time period, reperform the division of the service device subset in the new period according to the re-counted available resource information, redetermine the allocation weight corresponding to the service device subset in the new period, and perform the allocation of the service request received in the new time period according to the redetermined allocation weight. In this reciprocating loop, the update of the service device subset is reperformed every time period, which ensures the accuracy and real-time performance of the division of the service device subset, thereby implementing the purpose of reasonably allocating the service request to the service device subset.

In an embodiment, the description is provided using an example in which a time period is 5 seconds. The computer device pre-counts the available resource information corresponding to each service device in real time, and divides the service devices into groups according to the magnitude of the available resource information to obtain multiple levels of service device subsets, so that the division of the service device subset is not performed again in the 5-second time period, and the service request allocation is performed based on the service device subset. Only when the time exceeds the current 5-seconds can the service device re-count the latest available resource information of each service device in the service device set and reperform the division of the service device subset, so that all the service requests received in the next 5 seconds are allocated according to the latest service device subset obtained by the count.

In the above embodiments, the load of all the service devices in the service device set is quantified to obtain the available resource information, the available resource information of the service device is collected every N seconds, the service devices are sorted according to the collected available resource information, and the service devices are graded according to the order corresponding to the sort, to obtain the plurality of service device subsets. By performing the group division every N seconds, a collection delay requirement for the available resource information in the service device set is relatively low, and the calculation amount is reduced. In addition, by calculating the allocation weight of each service device subset, the service request may be allocated to the target service device subset according to the allocation weight. Furthermore, polling allocation may be further performed in the target service device subset, to implement reasonable allocation for the service request and implement load balancing of each service device.

Figure 4:
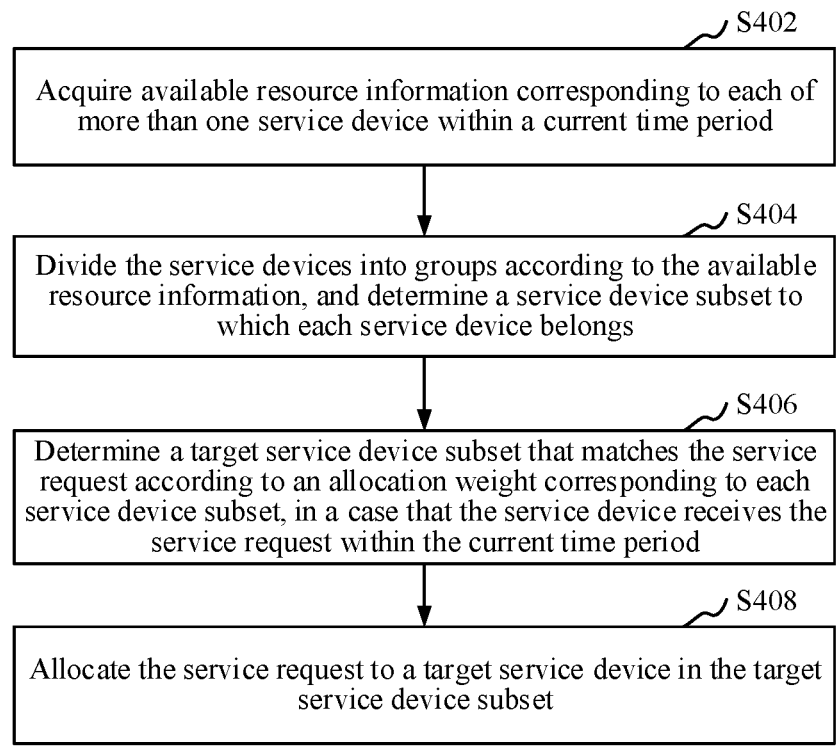
FIG. 4 is a schematic flowchart of a service request allocation method in another embodiment.

FIG. 4 is a schematic flowchart of a service request allocation method in another embodiment. In an embodiment, the service request allocation method further includes:

Step S402: Acquire available resource information corresponding to each of more than one service device within a current time period.

Step S404: Divide the service devices into groups according to the available resource information, and determine a service device subset to which each service device belongs.

Step S406: Determine a target service device subset that matches the service request according to an allocation weight corresponding to each service device subset, when the service device receives the service request within the current time period.

Step S408: Allocate the service request to a target service device in the target service device subset.

The limitation of steps S402, S404, S406, and S408 refers to the relevant descriptions of steps S302, S204, S206, S210, and S210, and details of this embodiment of this application are not repeated herein.

In the foregoing embodiment, the available resource information of each service device is counted once within the current time period, and the step of dividing the service device according to the counted available resource information is performed, to obtain the plurality of service device subsets corresponding to the current time period. Furthermore, all the service requests acquired in the current time period can be allocated according to the service device subset determined within the current time period. When the next time period is reached, the available resource information of each service device is re-counted, and the division of the service device subset is reperformed. In the whole process, a load calculation and an update of the service device subset are performed with a time period as a unit, and there is no need to update the service device subset in real time, which does not have problem of delay in load information count, and reduces the calculation amount and improves the efficiency of service request allocation.

In an embodiment, the determining available resource information corresponding to each of more than one service device in the service device set within a current time period includes: determining valid resource information corresponding to each service device in the service device set; collecting current idle resource information corresponding to each service device in the service device set within the current time period; and determining the available resource information corresponding to each of the service devices according to a comparison value between the current idle resource information and the valid resource information.

The valid resource information is quantitative information obtained by quantifying a valid resource, and may be represented by a specific value specifically. In addition, when the value corresponding to the valid resource information is greater, it indicates that there are more valid resources of the service device, which may also be understood that the valid resource information is the maximum loadable resource value of the service device. The valid resource information is the data acquired during stress testing of each type of service device before going online, and the valid resource may be measured by indicators such as CPU, memory, traffic, and magnetic disk of each service device. The traffic may be intranet traffic, and CPU is a dynamic indicator, which fluctuates greatly. In an embodiment, the valid resource may be measured using a quantity of accessible users and a quantity of virtual rooms. For example, the valid resource information may be determined by a maximum quantity of accessible users (max_user_cnt), a maximum quantity of virtual rooms (max_room_cnt), and a maximum upstream and downstream bandwidth (max_in_flow, max_out_flow) that can be supported by the service device. In other embodiments, considering that the service request that needs to be processed have little impact on the magnetic disk, which can be ignored, the valid resource information may be measured without using the resource occupied by magnetic disk.

The idle resource information is quantitative information obtained by quantifying the idle resource. The current idle resource information is idle resource information corresponding to the service device within the current time period. The idle resource is a device resource that is not occupied in the service device currently and is available for use.

In some embodiments, the valid resource information and the current idle resource information corresponding to each of all the service devices in the service device set are collected based on a heartbeat algorithm within the current time period. The available resource information corresponding to each service device is determined according to a ratio between the current idle resource information and the valid resource information. For example, the computer device may determine the available resource information corresponding to the current service device according to the valid resource information corresponding to the current service device and the current idle resource information corresponding to the current service device.

In an embodiment, within the current time period, the computer device determines the valid resource information corresponding to each service device in the current time period. Because the valid resource information is attribute information inherent in the service device, the computer device may directly acquire the valid resource information of each service device, and the valid resource information of each service device may be fixed and constant in different time periods. The valid resource information may include a maximum quantity of accessible users (max_user_cnt), a maximum quantity of virtual rooms that are allowed to be applied for (max_room_cnt), a maximum value of incoming traffic (max_in_flow), and a maximum value of outgoing traffic (max_out_flow). The maximum value of incoming traffic and the maximum value of outgoing traffic may also be referred to as a valid upstream bandwidth and a valid downstream bandwidth (max_in_flow, max_out_flow). The computer device counts the current idle resource information of each service device, such as counting a quantity of currently accessible users (curr_user_cnt), a current quantity of virtual rooms (curr_room_cnt), and a current uplink and downlink bandwidth (curr_in_flow, curr_out_flow) for current service. Then, the computer device determines the available resource information corresponding to each service device according to a comparison value between the counted current idle resource information and valid resource information. The comparison value is a difference value between two values, and In some embodiments, the difference value between two values may be determined through a mathematical calculation. The mathematical calculation is, for example, dividing two numbers directly, taking a logarithm and then dividing the two numbers, subtracting the two numbers, or performing other calculations and then dividing the two numbers.

In an embodiment, the comparison value may be a ratio obtained by calculating a ratio. In this case, each ratio is as follows: Ratio of quantity of accessible users=curr_user_cnt/max_user_cnt, ratio of quantity of available virtual rooms=curr_room_cnt/max_room_cnt, incoming traffic idle ratio=curr_in_flow/max_in_flow, outgoing traffic idle ratio=curr_out_flow/max_out_flow. In another embodiment, the comparison value may alternatively be a difference obtained by a difference calculation, or the like, which is not limited herein. All the cases can be expressed are within the protection scope of this application as long as the obtained comparison value can measure a difference state of a value with respect to another value, that is, a relative magnitude relationship between the current idle resource information and the valid resource information. In an embodiment, the computer device may integrate the ratio of quantity of accessible users, the ratio of quantity of available virtual rooms, the incoming traffic idle ratio, and the outgoing traffic idle ratio, to obtain the comparison value between the current idle resource information and the valid resource information.

In an embodiment, the current idle resource information includes a quantity of currently accessible users, a current quantity of virtual rooms, a current idle value of incoming traffic, and a current idle value of outgoing traffic. In some embodiments, the quantity of currently accessible users may be a difference between the maximum quantity of accessible users and a quantity of currently connected users. In some embodiments, the current quantity of virtual rooms may be a difference between the maximum quantity of virtual rooms that are allowed to be applied for and a quantity of virtual rooms that have been applied for currently. In some embodiments, the current idle value of incoming traffic may be a difference between the maximum value of incoming traffic and a value of incoming traffic occupied currently. In some embodiments, the current idle value of outgoing traffic may be a difference between the maximum value of outgoing traffic and a value of outgoing traffic occupied currently.

If the quantity of currently connected users is greater than the maximum quantity of accessible users, the maximum quantity of accessible users is assigned to the quantity of currently connected users, to prevent the quantity of currently accessible users from being a negative value in the calculation. If the quantity of virtual rooms that have been applied for currently is greater than the maximum quantity of virtual rooms that are allowed to be applied for, the maximum quantity of virtual rooms that are allowed to be applied for is assigned to the value of the quantity of virtual rooms that have been applied for currently, to prevent the current quantity of virtual rooms from being a negative value in the calculation. If the value of incoming traffic occupied currently is greater than the maximum value of incoming traffic, the maximum value of incoming traffic is assigned to the value of incoming traffic occupied currently, to prevent the current idle value of incoming traffic from being a negative value in the calculation. If the value of outgoing traffic occupied currently is greater than the maximum value of outgoing traffic, the maximum value of outgoing traffic is assigned to the value of outgoing traffic occupied currently, to prevent the current idle value of outgoing traffic from being a negative value in the calculation.

In the foregoing embodiment, the valid resource and the idle resource of the service device are quantified to obtain the valid resource information and the idle resource information. Then, within the current time period, the comparison value between the current idle resource information and the valid resource information of each service device is calculated, and thereby the available resource information corresponding to each service device is determined, and the service devices are divided into groups according to the available resource information, to obtain the plurality of service device subsets. Accordingly, the service device subset is updated in real time in different time periods, and the accuracy of the service request allocation is improved.

In an embodiment, the valid resource information includes a maximum quantity of accessible users, a maximum quantity of virtual rooms that are allowed to be applied for, a maximum value of incoming traffic, and a maximum value of outgoing traffic. the current idle resource information includes a quantity of currently accessible users, a quantity of currently accessible virtual rooms, a current idle value of incoming traffic, and a current idle value of outgoing traffic. The determining the available resource information corresponding to each of the service devices according to a comparison value between the current idle resource information and the valid resource information includes: determining a first comparison value corresponding to each service device according to the quantity of currently accessible users and the maximum quantity of accessible users corresponding to each service device; determining a second comparison value corresponding to each service device according to the quantity of virtual rooms that are currently allowed to be applied for and the maximum quantity of virtual rooms that are allowed to be applied for corresponding to each service device; determining a third comparison value corresponding to each service device according to the current idle value of incoming traffic and the maximum value of incoming traffic corresponding to each service device; determining a fourth comparison value corresponding to each service device according to the current idle value of outgoing traffic and the maximum value of outgoing traffic corresponding to each service device; and using, for each service device in the service device set, a minimum value among the first comparison value, the second comparison value, the third comparison value, and the fourth comparison value corresponding to the corresponding service device as the available resource information corresponding to the corresponding service device.

The performance indicator used to measure the valid resource of the service device may include, but not limited to, the quantity of accessible users, the quantity of virtual room, and a traffic value. In some embodiments, the maximum quantity of accessible users refers to a maximum quantity value of users that the service device allows to access. The maximum quantity of virtual rooms that are allowed to be applied for refers to a maximum quantity value of virtual rooms that the service device provides and are allowed to be applied for. The maximum value of incoming traffic and the maximum value of outgoing traffic refer to maximum values of incoming and outgoing traffic that the service device can provide. The valid resource information is attribute information inherent in the service device. That is, for a specific service device, loadable valid resource information thereof is a determined value. When the value reaches the maximum value of the valid resource information, the service device cannot receive more load tasks within the executable capability of the service device. Otherwise, the service device is overloaded, and is down or have other faults.

The current idle resource information refers to idle resource that the service device still has at the current time, and the idle resource may be used to perform a specific service request task. Compared to the performance indicator of the valid resource, the idle resource may include the quantity of currently accessible users, the quantity of currently accessible virtual rooms, the current idle value of incoming traffic, and the current idle value of outgoing traffic. It may be understood that the valid resource of the service device is determined by a sum of the current idle resource of the service device and the currently occupied resource of the service device. Generally, for a same service device, the valid resource information thereof is a determined value, and when the currently occupied resource of the service device is less, the corresponding current idle resource information thereof is larger, that is, the probability of receiving the service request is larger.

In some embodiments, the computer device may calculate a comparison value corresponding to each performance indicator according to the valid resource information and the idle resource information corresponding to each performance indicator. In an embodiment, the computer device determines a corresponding first comparison value, that is, determines the first comparison value corresponding to each service device, according to the quantity of currently accessible users and the maximum quantity of accessible users corresponding to each service device. The computer device determines a corresponding second comparison value, that is, determines the second comparison value corresponding to each service device, according to the quantity of virtual rooms that are currently allowed to be applied for and the maximum quantity of virtual rooms that are allowed to be applied for corresponding to each service device. The computer device determines a corresponding third comparison value, that is, determines the third comparison value corresponding to each service device, according to the current idle value of incoming traffic and the maximum value of incoming traffic corresponding to each service device. The computer device determines a corresponding fourth comparison value, that is, determines the fourth comparison value corresponding to each service device, according to the current idle value of outgoing traffic and the maximum value of outgoing traffic corresponding to each service device.

In an embodiment, for each service device, the computer device extracts a minimum value among the corresponding first comparison value, second comparison value, third comparison value, and fourth comparison value, and uses the extracted minimum value as the available resource information corresponding to the corresponding service device. For example, the available resource information (quantitative value)=Min (first comparison value, second comparison value, third comparison value, fourth comparison value). In addition, in some embodiments, alternatively, the obtained available resource information may be expanded by a certain multiple, such as 100,000 times, to normalize the available resource information, thereby preventing the loss of processing precision of the computer device due to the fact that data processed in the calculation process is a decimal. In an embodiment, for each service device in the service device set, the computer device may calculate a comprehensive value according to the first comparison value, the second comparison value, the third comparison value, and the fourth comparison value corresponding to the current service device, and use the comprehensive value as the available resource information corresponding to the current service device.

In an embodiment, for each service device in the plurality of service devices, the computer device uses a quotient of the quantity of currently accessible users corresponding to the current service device and the maximum quantity of accessible users as the first comparison value corresponding to the current service device. The computer device uses a quotient of the quantity of virtual rooms that are currently allowed to be applied for and the maximum quantity of virtual rooms that are allowed to be applied for corresponding to the current access device as the second comparison value corresponding to the current service-related device. The computer device uses a quotient of the current idle value of incoming traffic and the maximum value of incoming traffic corresponding to the current access device as the third comparison value corresponding to the current access device. The computer device uses a quotient of the current idle value of outgoing traffic and the maximum value of outgoing traffic corresponding to the current access device as the fourth comparison value corresponding to the current access device.

In the foregoing embodiment, the comparison values corresponding to each of the plurality of performance indicators of the service device are calculated, and the minimum value of the plurality of comparison values is determined as the available resource information of the service device. The available resource information of the service device is determined using a shortest side effect (barrel effect), which ensures that the service device will not be down due to excessive load when receiving the service request within the available resource information, making the determination of the available resource information more reasonable. In addition, the different models of service device in the service device set are uniformly abstracted into a piece of available resource information, to use the available resource information to represent a maximum service capability of different types of service device, thereby implementing the uniform allocation processing on different types of service device.

In an embodiment, the service request allocation method further includes: respectively determining a subset weight corresponding to each of the service device subsets according to the idle resource of each service device in each of the service device subsets; determining a total set weight corresponding to the service device set according to the subset weight corresponding to each of the service device subsets; and respectively determining an allocation weight corresponding to each service device subset according to a comparison value between the subset weight corresponding to each of the service device subsets and the total set weight.

The subset weight refers to a proportion of the service device subset in the service device set. When the subset weight is larger, the proportion of the service device subset in the service device set is correspondingly larger, that is, the service device subset has more idle resources currently, and may further receive more service loads. The total set weight is determined by the idle resources corresponding to all the service devices in the service device set. For example, the total set weight may be a sum of the idle resources corresponding to all the service devices in the service device set.

In some embodiments, the step of determining an allocation weight corresponding to each service device subset specifically includes: calculating a sum of the idle resource information corresponding to each service device in each service device subset, to determine a subset weight corresponding to each service device subset; calculating a sum of the subset weight corresponding to each service device subset, to determine a total set weight; and determining the allocation weight corresponding to each service device subset according to a comparison value between each subset weight and the total set weight.

In an embodiment, the computer device counts the idle resource information of all the service devices in the service device set, and sorts the service devices according to the magnitude corresponding to the idle resource information. The service devices are divided into N grades according to a predetermined group division ratio (grading ratio). For example, when the grading ratio N=5, the service devices ranked in a range of 0% to 10% are divided into grade G1; the service devices ranked in a range of 10% to 25% are divided into grade G2; the service devices ranked in a range of 25% to 50% are divided into grade G3; the service devices ranked in a range of 50% to 85% are divided into grade G4; and the service devices ranked in a range of 85% to 95% are divided into grade G5. Then, the service device obtains the subset weights corresponding to each service device subset according to the idle resource information corresponding to the service device included in the service device subset of each grade. The subset weights are: w1, w2, w3, w4, and w5 respectively. The calculated total set weight corresponding to all the service devices is W_all=w1+w2+w3+w4+w5. The calculated allocation weights corresponding to each service device subset are W1=w1/W_all*100, W2=w2/W_all*100, W3=w3/W_all*100, W4=w4/W_all N*100, and W5=w5/W_all*100, respectively. It may be understood that when the service device subset corresponds to N grades, the total set weight in this case is W_all=(w1+ . . . +wn)*100, and the allocation weight corresponding to the service device subset of grade Gm is Wm=wm/w_all*100. In this embodiment, considering that the idle resource information of the service devices ranked in a range of 95% to 100% is very small, that is, these service devices have a very high current load rate and are even on the verge of being overloaded, it may be considered not to continue allocating the service request to the service devices ranked in a range of 95% to 100%.

In the foregoing embodiment, by calculating the allocation weight of each service device subset, quantitative processing for the idle resource information of each service device subset is implemented, and the allocation weight with a corresponding magnitude is set for each service device subset according to the magnitude of the idle resource. Moreover, by allocating the service request with corresponding quantity to each service device subset according to the allocation weight corresponding thereto, reasonable allocation for the service request is implemented, and load balancing of the service device in each service device subset is implemented.

Figure 5:
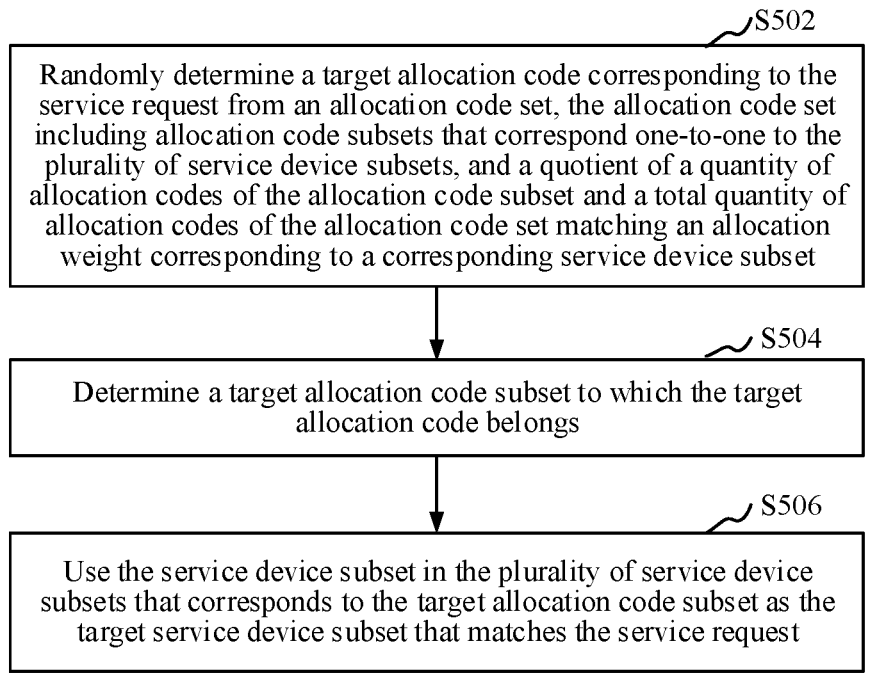
FIG. 5 is a schematic flowchart of a step of determining a target service device subset that matches a service request according to an allocation weight corresponding to each service device subset according to an embodiment.

FIG. 5 is a schematic flowchart of a step of determining a target service device subset that matches a service request according to an allocation weight corresponding to each service device subset according to an embodiment. In an embodiment, In some embodiments, step S206, that is, the step of determining a target service device subset that matches the service request according to an allocation weight corresponding to each service device subset, further includes:

Step S502: Randomly determine a target allocation code corresponding to the service request from an allocation code set, the allocation code set including allocation code subsets that correspond one-to-one to the plurality of service device subsets, and a quotient of a quantity of allocation codes of the allocation code subset and a total quantity of allocation codes of the allocation code set matching an allocation weight corresponding to a corresponding service device subset.

The allocation code set includes more than one allocation code, the magnitude of the allocation code is within a preset range interval, and each allocation code may correspond to a same or different value, which are not limited in this application. In some embodiments, the allocation code may be a random code, which is a value randomly generated in the computer device and is within a preset range.

The allocation code subset is a subset obtained by dividing the allocation codes in the allocation code set into groups, and each allocation code subset includes more than one allocation code. In some embodiments, the allocation codes in the allocation code set may be sorted according to the magnitude of the value, and then the allocation codes are divided into groups according to a preset group division ratio, to obtain more than one allocation code subset. In addition, a quantity of allocation code subsets is the same as the quantity of service device subsets, and each allocation code subset corresponds to a service device subset.

In an embodiment, the computer device divides a preset quantity of allocation codes into different groups according to a sorting order of the allocation codes, to obtain a plurality of allocation code subsets. For example, when a value interval of the allocation code in the allocation code set is 0 to 100, the allocation codes in a value interval of 0 to 10 may be divided into grade g1, the allocation codes in a value interval of 10 to 25 may be divided into grade g2, the allocation codes in a value interval of 25 to 50 may be divided into grade g3, the allocation codes in a value interval of 50 to 85 may be divided into grade g4, the allocation codes in a value interval of 85 to 95 may be divided into grade g5, and the plurality of allocation code subsets may be obtained according to the allocation codes in different grades.

In an embodiment, alternatively, the computer device may divide the allocation code into different groups according to the sort, to obtain the plurality of allocation code subsets. For example, the allocation codes ranked in a range of 0% to 10% may be divided into grade g1, the allocation codes ranked in a range of 10% to 25% may be divided into grade g2, the allocation codes ranked in a range of 25% to 50% may be divided into grade g3, the allocation codes ranked in a range of 50% to 85% may be divided into grade g4, the allocation codes ranked in a range of 85% to 95% may be divided into grade g5, and the plurality of allocation code subsets may be obtained according to the allocation codes in different grades.

In an embodiment, the computer device divides the preset quantity of allocation codes into different groups, to obtain the plurality of allocation code subsets. For example, when a value interval of the allocation code in the allocation code set is 0 to 100, different 10 allocation codes may be divided into grade g1, different 15 allocation codes may be divided into grade g2, different 25 allocation codes may be divided into grade g3, different 35 allocation codes may be divided into grade g4, the remaining 10 allocation codes may be divided into grade g5, and the plurality of allocation code subsets may be obtained according to the allocation codes in different grades.

A quotient of the quantity of allocation codes included in each allocation code subset and the total quantity of allocation codes of the allocation code set matches an allocation weight corresponding to a corresponding service device subset. That is, when there are more allocation codes included in the allocation code subset, an allocation code subset weight corresponding to the allocation code subset is larger. In this case, the allocation code subset corresponds to a service device subset with a relatively large allocation weight. That is, when there are less allocation codes included in the allocation code subset, the allocation code subset weight corresponding to the allocation code subset is smaller. In this case, the allocation code subset corresponds to a service device subset with a relatively small allocation weight.

In an embodiment, whenever receiving a service request, the computer device generates a random number in the service device according to the function of rand ( ) % 100. In addition, the random number is in a range of 0 to 100, and is used as a target allocation code. Then, a matching target service device is determined according to the randomly generated target allocation code. In an embodiment, it may alternatively be understood that values in a range of 0 to 100 are stored in the allocation code set. Whenever receiving a service request, the computer device acquires a value from the allocation code set randomly, then the value is used as the target allocation code, and the target service device is matched according to the target allocation code.

Step S504: Determine a target allocation code subset to which the target allocation code belongs.

The computer device determines a target allocation code subset to which the target allocation code belongs according to the magnitude corresponding to target allocation code.

Step S506: Use the service device subset in the plurality of service device subsets that corresponds to the target allocation code subset as the target service device subset that matches the service request.

In some embodiments, the computer device determines the allocation code subset weight corresponding to each allocation code subset according to the quotient of a quantity of allocation codes in each allocation code subset and the total quantity of allocation codes in the allocation code set. In addition, each allocation code subset weight corresponds to an allocation weight of a service device subset.

In an embodiment, the determining a correspondence between the allocation code subset and the service device subset includes: determining quantities of allocation codes in each of the allocation code subsets and a total quantity of allocation codes in the allocation code set, and determining a quotient of each of the quantities of allocation codes and the total quantity of allocation codes; determining an allocation code subset weight of each allocation code subset according to the quotient of each of the quantities of allocation codes and the total quantity of allocation codes; sorting the allocation code subsets according to the magnitude of the allocation code subset weight, and sorting the service device subsets according to the magnitude of the allocation weight; and storing the allocation code subset and the service device subset having a same sorting order in an associated manner, to obtain a correspondence between the allocation code subset and the service device subset.

In some embodiments, the allocation code subsets are sorted according to the magnitude of the allocation code subset weight, the service device subsets are sorted according to the magnitude of the allocation weight, and the corresponding allocation code subset and service device subset are sequentially matched according to the corresponding sorting order, and the corresponding allocation code subset and service device subset may be further associated and stored accordingly. In some embodiments, a large allocation code subset weight corresponds to a large allocation weight, that is, an allocation code subset corresponding to a large allocation code subset weight corresponds to a service device subset corresponding to a large allocation weight.

The computer device searches for a service device subset matching the target allocation code subset in the data correspondingly stored in advance according to the determined target allocation code subset, and uses the found service device subset as the target service device subset that matches the service request.

In the foregoing embodiment, because the allocation code subset weight corresponding to each allocation code subset is determined according to the quantity of allocation codes included in each allocation code subset, the allocation code subset weight corresponding to the allocation code subset including the greater quantity of allocation codes is larger. In a specific service scenario, each service request corresponds to a randomly determined target allocation code. Because the target allocation code is randomly determined, that is, the probability that the target allocation code is any allocation code in the allocation code set is the same, the probability that the target allocation code falls in each allocation code subset is consistent with the allocation code subset weight corresponding to each allocation code subset That is, when the allocation code subset weight is greater, the probability that the randomly determined target allocation code falls within its range is larger, and the probability that the service request is allocated to the target service device subset corresponding to the allocation code subset is larger. In the foregoing embodiment, a deterministic principle in random event is cleverly used to match a corresponding target service device subset for each service request, so that the service device subset with a larger allocation weight has a larger probability of being allocated with a service request, and the service device subset with a smaller allocation weight has a smaller probability of being allocated with a service request, thereby implementing reasonable allocation of the service request and implementing the effect of load balancing of the service device.

Figure 6:
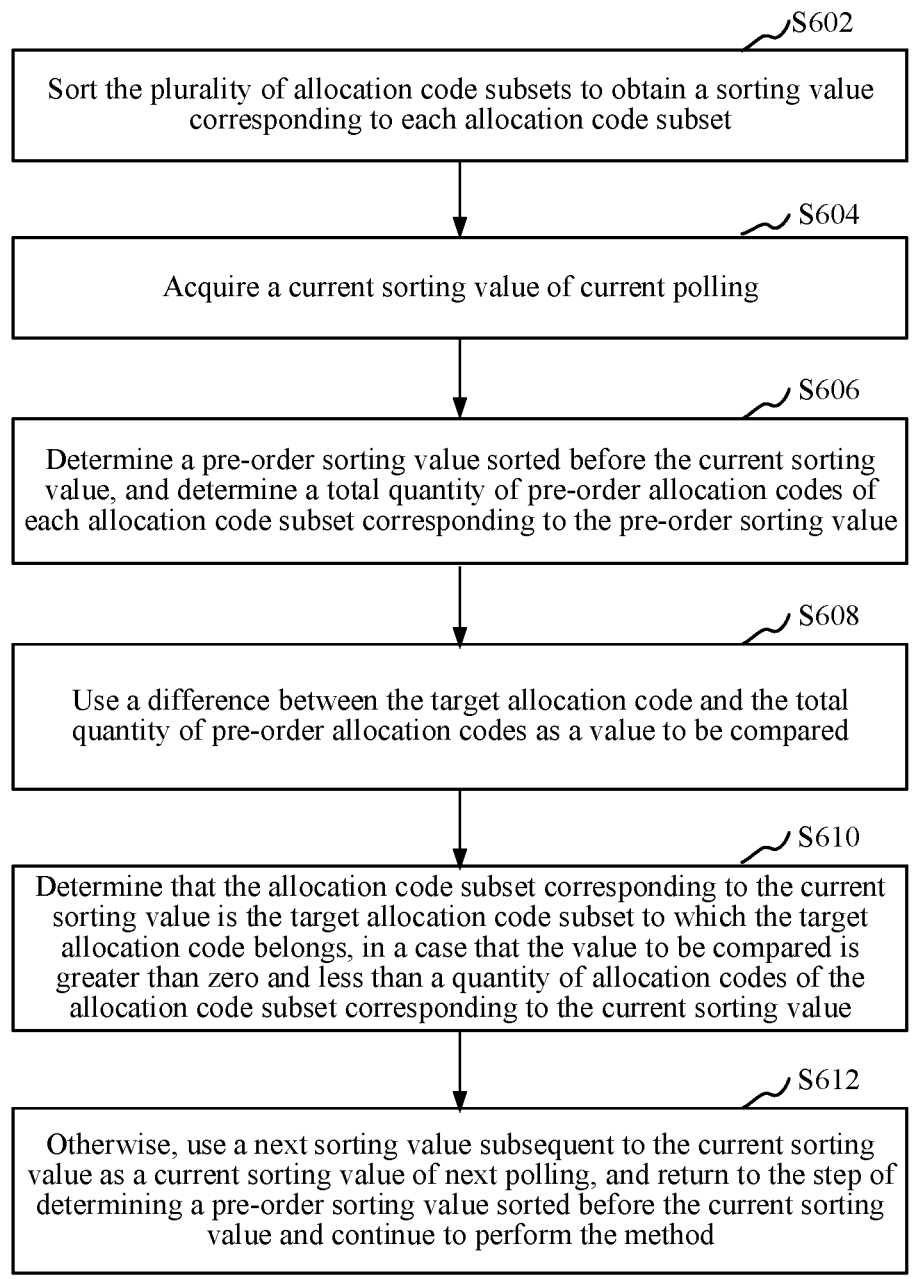
FIG. 6 is a schematic flowchart of a step of determining a target allocation code subset to which a target allocation code belongs according to an embodiment.

FIG. 6 is a schematic flowchart of a step of determining a target allocation code subset to which a target allocation code belongs according to an embodiment. In an embodiment, In some embodiments, the step of determining a target allocation code subset to which the target allocation code belongs further includes:

Step S602: Sort the plurality of allocation code subsets to obtain a sorting value corresponding to each allocation code subset.

In some embodiments, the computer device sorts the allocation code subsets according to the quantity of allocation codes included in the allocation code subsets, to obtain sorting values corresponding to each allocation code subset.

In an embodiment, the computer device sorts the allocation code subsets according to the quantity of allocation codes included in the allocation code subsets, to obtain sorting values corresponding to each allocation code subset. Table 1 shows allocation code subset information according to an embodiment. In Table 1, if a first allocation code subset includes 35 allocation codes, a second allocation code subset includes 30 allocation codes, a third allocation code subset includes 20 allocation codes, a fourth allocation code subset includes 10 allocation codes, and a fifth allocation code subset includes 5 allocation codes, the plurality of allocation code subsets are sorted to obtain the sorting values corresponding to each allocation code subset, and each sorting value is as follows: The sorting value of the first allocation code subset is first, the sorting value of the second allocation code subset is second, the sorting value of the third allocation code subset is third, and the sorting value of the fourth allocation code subset is fourth, and the sorting value of the fifth allocation code subsets is fifth.

TABLE 1

| Allocation code subset | Allocation code subset information | | | | |
| --- | --- | --- | --- | --- | --- |
| | First allocation code subset | Second allocation code subset | Third allocation code subset | Fourth allocation code subset | Fifth allocation code subset |
| Quantity of allocation codes | 35 | 30 | 20 | 10 | 5 |
| Sorting value | First | Second | Third | Fourth | Fifth |
| Current sorting value | First | Second | Third | Fourth | Fifth |
| Pre-order sorting value | None | First | Second, third | First, second, third | First, second, third, fourth |

Step S604: Acquire a current sorting value of current polling.

The computer device polls the corresponding allocation code subset sequentially according to the sorting value of each allocation code subset, and the current polling refers to a current cycle process. The current sorting value refers to the sorting value that is polled to in the state of current polling. In some embodiments, the computer device polls the corresponding allocation code subset in descending order of the sorting value, and determines the corresponding current sorting value for each polling.

In an embodiment, referring to Table 1, the computer device first polls the first allocation code subset whose sorting value is first, and determines that the current sorting value is first. Then, the computer device sequentially polls the second allocation code subset whose sorting value is second, and determines that the current sorting value is second, and when the computer device polls the third allocation code subset currently, the current sorting value corresponding to the current polling is third.

Step S606: Determine a pre-order sorting value sorted before the current sorting value, and determine a total quantity of pre-order allocation codes of each allocation code subset corresponding to the pre-order sorting value.

The pre-order sorting value is relative to the current sorting value, and the pre-order sorting value refers to all the sorting values before the current sorting value.

In an embodiment, referring to Table 1 again, when the computer device polls the third allocation code subset currently, the corresponding current sorting value is third, the corresponding pre-order sorting value is second and first, and the total quantity of pre-order allocation codes of the allocation code subsets corresponding to the pre-order sorting value is the total quantity of the first allocation code subset (35) and the total quantity of the second allocation code subset (30). That is, the total quantity of pre-order allocation codes of each allocation code subset corresponding to the pre-order sorting value is 65.

Step S608: Use a difference between the target allocation code and the total quantity of pre-order allocation codes as a value to be compared.

In some embodiments, the computer device calculates a difference between the target allocation code determined randomly according to the service request and the total quantity of the pre-order allocation codes, and determines a value to be compared according to the difference. In an embodiment, when the target allocation code is 70 and the total quantity of pre-order allocation codes is 65, the calculated value to be compared is 15.

Step S610: Determine that the allocation code subset corresponding to the current sorting value is the target allocation code subset to which the target allocation code belongs, when the value to be compared is greater than zero and less than a quantity of allocation codes of the allocation code subset corresponding to the current sorting value.

Continuing the foregoing embodiment, it can be known that the value to be compared is 15 greater than zero, and the value to be compared 15 is less than the quantity (20) of allocation codes of the allocation code subset corresponding to the current sorting value, and thus it is determined that the allocation code subset corresponding to the current sorting value, that is, the third allocation code subset, is the target allocation code subset to which the target allocation code belongs.

Step S612: Otherwise, use a next sorting value subsequent to the current sorting value as a current sorting value of next polling, and return to the step of determining a pre-order sorting value sorted before the current sorting value and continue to perform the method.

In an embodiment, referring to Table 1 again, when the target allocation code is 70 and the current sorting value is second, in this case, the total quantity of pre-order allocation codes is 35, and the calculated value to be compared is 35. Although the value to be compared is 35 greater than zero, the value to be compared 35 is greater than the current sorting value 30, and thus a next sorting value subsequent to the current sorting value is used as the current sorting value of next polling, and the process returns to the step of determining a pre-order sorting value sorted before the current sorting value and continues to perform the method. It can be known that when the current sorting value is third, the condition is satisfied, and the third allocation code subset corresponding to the current sorting value is determined as the target allocation code subset to which the target allocation code belongs.

In an embodiment, whenever receiving a service request, the computer device randomly generates a random number R as the target allocation code by the function of rand ( ) % 100. If the target allocation code subset corresponding to the target allocation code R is Wm, in this case, the condition that is to be satisfied is: $0<(R-(W1+ \ldots +Wm-1))<Wm$, where Wm is the current sorting value, and $W1 \ldots Wm-1$ is the pre-order sorting value corresponding to the current sorting value.

In an embodiment, the determining a target allocation code subset to which the target allocation code belongs includes sorting the plurality of allocation code subsets; and pulling the allocation code subsets corresponding to each sorting value sequentially from an initial sorting value, until the target allocation code subset to which the target allocation code belongs is determined from the plurality of allocation code subsets. The following steps are performed in each polling: determining a pre-order sorting value sorted before the current sorting value, and determining a total quantity of pre-order allocation codes of each allocation code subset corresponding to the pre-order sorting value; using a difference between the target allocation code and the total quantity of pre-order allocation codes as a value to be compared; determining that the allocation code subset corresponding to the current sorting value is the target allocation code subset to which the target allocation code belongs, when the value to be compared is greater than zero and less than a quantity of allocation codes of the allocation code subset corresponding to the current sorting value; and otherwise, performing next polling.

In the foregoing embodiment, in the process of determining the target allocation code subset to which the target allocation code belongs, the corresponding value to be compared is calculated in each polling process, and the target allocation code is determined according to the magnitude of the value to be compared, so that the determination of the target allocation code subset is simple and feasible, and the efficiency of determining the target allocation code subset is improved.

The following uses an example to specifically describe a specific process of dividing the service device set into groups to obtain the plurality of service device subsets, to determine the target service device subset from the plurality of service device subsets when the service request is acquired:

It is assumed that the service device set includes 100 service devices. The service devices are determined to be divided into five grades based on service experience, and interval ranges corresponding to each grade are [1% to 10%], [11% to 25%], [26% to 50%], [51% to 85%], and [86% to 95%], respectively. In one embodiment, before the service devices are allocated, the service devices are sorted in descending order according to the available resource information ($w_1, w_2, \ldots, w_{100}$) corresponding to each service device. Accordingly, the service devices sorted from 1 to 10 are divided into a first grade to obtain a first-grade service device subset, the first-grade service device subset corresponds to the idlest grade, and a subset weight corresponding to the first-grade service device subset is: $W_1 = w_1 + w_2 + \ldots + w_{10}$. $w_1, w_2, \ldots, w_{10}$ are idle resources corresponding to each service device sorted from 1 to 10, respectively. The service devices sorted from 11 to 25 are divided into a second grade to obtain a second-grade service device subset, and a subset weight corresponding to the second-grade service device subset is: $W_2 = w_{11} + w_{12} + \ldots + w_{25}$. The service devices sorted from 26 to 50 are divided into a third grade to obtain a third-grade service device subset, and a subset weight corresponding to the third-grade service device subset is: $W_3 = w_{26} + w_{27} + \ldots + w_{50}$. The service devices sorted from 51 to 85 are divided into a fourth grade to obtain a fourth-grade service device subset, and a subset weight corresponding to the fourth-grade service device subset is: $W_4 = w_{51} + w_{52} + \ldots + w_{85}$. The service devices sorted from 86 to 95 are divided into a fifth grade to obtain a fifth-grade service device subset, the fifth-grade service device subset is the busiest grade, and a subset weight corresponding to the fifth-grade service device subset is: $W_5 = w_{86} + w_{52} + \ldots + w_{95}$. And a total weight corresponding to all the service devices is $Wall = w_1 + w_2 + \ldots + w_{95} = W_1 + W_2 + W_3 + W_4 + W_5$. Furthermore, the allocation weight of each grade of service device subset may be determined according to the subset weight of each grade of service device subset and the total weight of all the service devices.

When receiving the service request, the computer device randomly generates a target allocation code R corresponding to the service request. In some embodiments, the target allocation code may be obtained by the following formula: $R = \text{Rand}[1, Wall] - 1$. In addition, the grade to which the target allocation code R belongs is determined according to the magnitude relationship of R with the allocation weight of each grade. In some embodiments, when $R < W_1$, the target allocation code correspondingly belongs to the first grade. When $R < W_1 + W_2$, the target allocation code correspondingly belongs to the second grade. When $R < W_1 + W_2 + W_3$, the target allocation code correspondingly belongs to the third grade. When $R < W_1 + W_2 + W_3$, the target allocation code correspondingly belongs to the fourth grade. When $R < W_1 + W_2 + W_3 + W_4$, the target allocation code correspondingly belongs to the fifth grade.

Table 2 is a table of the idle resource information of the service device in different service device subsets. It is assumed that the service device set includes 100 service devices. The service devices in the service device set are sorted according to the idle resource information corresponding to each service device. And the service devices sorted in [1% to 10%] are divided into a same group, to obtain a first-grade service device subset, where the first service device subset includes 10 service devices, and the idle resource information of each service device is 6 w. The service devices sorted in [11% to 25%] are divided into a group, to obtain a second-grade service device subset, where the second service device subset includes 15 service devices, and the idle resource information of each service device is 5 w. The service devices sorted in [26% to 50%] are divided into a group, to obtain a third-grade service device subset, where the third-grade service device subset includes 25 service devices, and the idle resource information of each service device is 2 w. The service devices sorted with [51% to 75%] are divided into a group, to obtain a fourth-grade service device subset, where the fourth service device subset includes 25 service devices, and the idle resource information of each service device is 1 w. And the service devices sorted in [76% to 100%] are divided into a group, to obtain a fifth-grade service device subset, where the fifth service device subset includes 25 service devices, and the idle resource information of each service device is 0 w. The idle resource information of each service device in the fifth-grade service device subset is almost 0, and thus the service request is no longer allocated to the fifth-grade service device subset. In addition, in a specific application scenario, when the service request is a conference request, a conference duration corresponding to the conference request is much longer than the time period for updating the service device subset. Therefore, the service request is not allocated to the fifth-grade service device subset (service device subset with a high load) within a time period (for example, within 5 s), which may further prevent the gap of task loading between different grades of service device subsets from further increasing.

TABLE 2

Idle resource information of service device in different service device subsets
Random strategy

| Service device subset | First-grade service device subset | Second-grade service device subset | Third-grade service device subset | Fourth-grade service device subset | Fifth-grade service device subset |
|---|---|---|---|---|---|
| Interval range | [1% to 10%] | [11% to 25%] | [26% to 50%] | [51% to 75%] | [76% to 100%] |
| Service device 1 | 6 w | 5 w | 2 w | 1 w | 0 |
| Service device 2 | 6 w | 5 w | 2 w | 1 w | 0 |
| Service device . . . | . . . | . . . | . . . | . . . | . . . |
| Service device m | 6 w | 5 w | 2 w | 1 w | 0 |
| Subset weight | 6 w*10 | 5 w*15 | 2 w*25 | 1 w*25 | 0 |

As can be seen from Table 2, the idle resource information of the service device in each grade of service device subset may be considered substantially the same. In an embodiment, the service request allocated to the target service device subset may be allocated to the service device in the target service device subset according to a polling strategy. In other embodiments, the idle resource information of each service device in each service device subset may alternatively have a large difference, which is not limited in this application.

In an embodiment, In some embodiments, the step of step S208, that is, step of selecting a target service device from the target service device subset further includes: determining a queuing order of each service device in the target service device subset, and using a service device that is currently polled when polling is performed according to the queuing order as the current target service device.

In some embodiments, in the target service device subset, the service devices may be sorted according to the idle resource information corresponding to each service device, or the service devices may be randomly arranged in the service device subset.

In an embodiment, the service devices are sorted in the target service device. After the service request is allocated to the target service device subset, the service device currently polled when polling is performed according to the queuing order is used as the current target service device. That is, the service device is polled in the target service device subset sequentially according to the queuing order, and the service device that is polled in the current time is used as the target service device corresponding to the current service request. The target service device is screened through the polling algorithm, so that the probability of being determined as the target service device is consistent for the service devices in the target service device subset, and load balancing of the service device in the target service device subset is implemented.

In an embodiment, after the service request is allocated to the target service device subset, a service device with largest idle resource information is selected as the target service device according to the sort of each service device in the target service device, and then the service request is allocated to the corresponding target service device. By allocating the service request to the target service device with largest idle resource information, to execute the service request by the target service device with strongest execution capability, the efficiency of processing the service request is improved, and load balancing of the service device in the target service device subset is also implemented.

In another embodiment, after the service request is allocated to the target service device subset, a service device is randomly selected from the target service device subset as the target service device, and then the service request is allocated to the corresponding target service device. Because the idle resources of each service device in the target service device subset are substantially the same, any service device in the target service device subset may be used as the target service device to process the service request, and there is no need to select the target service device using complex algorithm, which makes the algorithm more efficient and makes less use of the computer resource, thereby improving the efficiency of processing service requests.

Figure 7:
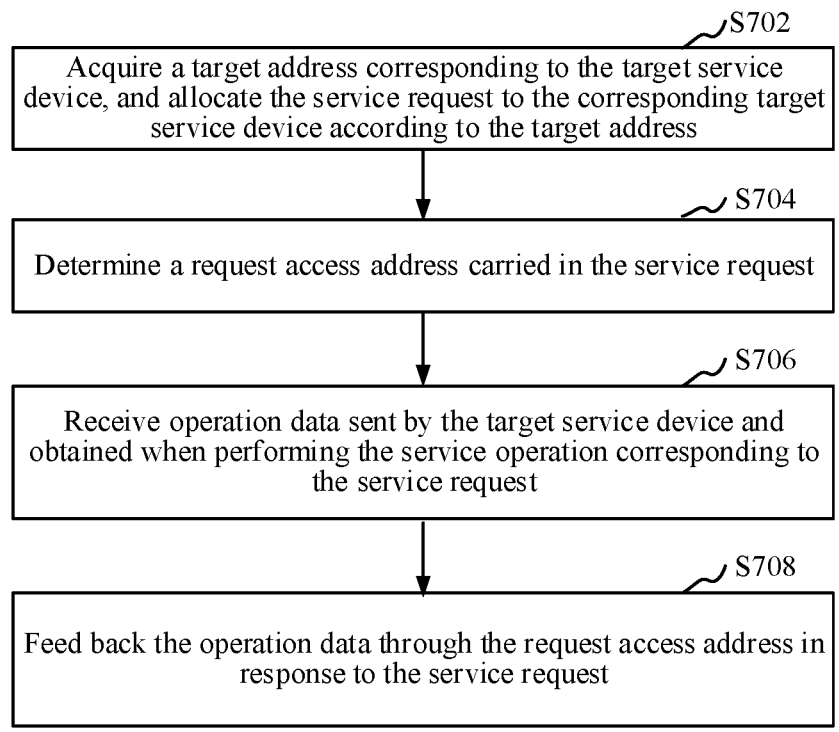
FIG. 7 is a schematic flowchart of a step of allocating a service request to a target service device according to an embodiment.

FIG. 7 is a schematic flowchart of a step of allocating a service request to a target service device according to an embodiment. In an embodiment, In some embodiments, step S210, that is, the step of allocating the service request to the target service device may further include:

Step S702: Acquire a target address corresponding to the target service device, and allocate the service request to the corresponding target service device according to the target address.

The target address may be an IP address, and the target address uniquely corresponds to the target service device. In some embodiments, the computer device sends the acquired service request to the corresponding target service device according to the target address.

In an embodiment, the service request allocation method further includes:

Step S704: Determine a request access address carried in the service request.

The request access address is an address that is carried in the service request and needs to be accessed. In some embodiments, the target address is not the same address as the request access address.

In an embodiment, when receiving the service request, the computer device extracts the carried request access address from the service request. Then, the computer device allocates the corresponding target service device for the service request, acquires the target address corresponding to the target service device, and modifies the request access address to the target address, to send the service request to the corresponding target service device according to the target address. In this step, it is implemented that the corresponding target service device is matched for the service request, and the service request is simultaneously allocated to the corresponding target service device according to the target address corresponding to the target service device.

Step S706: Receive operation data sent by the target service device and obtained when performing the service operation corresponding to the service request.

The operation data is corresponding data after the target service device receives the corresponding service request and performs the corresponding service operation on the service request. Then, the computer device acquires the operation data obtained from performing the service operation by the target service device, to transmit the operation data to the user side that sends the service request.

Step S708: Feed back the operation data through the request access address in response to the service request.

After acquiring the operation data generated by the target service device, the computer device modifies the target address to the request access address, and feeds back the operation data to the user side sending the service request according to the request access address.

Figure 8:
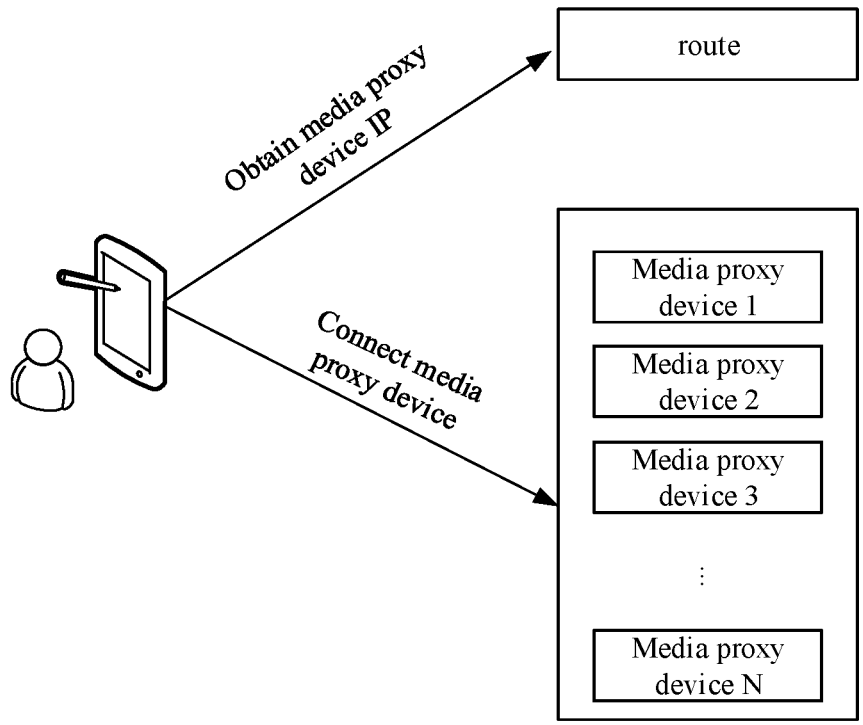
FIG. 8 is a schematic diagram of allocating a service request according to an IP address according to an embodiment.

FIG. 8 is a schematic diagram of allocating a service request according to an IP address according to an embodiment. In FIG. 8, the computer device may be a route, the service device set may be a media proxy device set, the service devices in the service device set may be a plurality of media proxy devices in the media proxy device set, and the media proxy device set includes N groups of media proxy devices, which are a media proxy device 1, a media proxy device 2, . . . , and a media proxy device N specifically. In some embodiments, one or more conference users of the user side send a request for acquiring an IP address of the media proxy device to the route, and the route matches a corresponding media proxy device for the request sent by the user according to the service request allocation method provided in this application. When the media proxy device matched by the route is the media proxy device 2, a media connection is established between the user and the media proxy device 2, to implement a communication connection between the user and the media proxy device 2. Furthermore, another target media proxy device may further be selected in the media proxy device 2, to use the target media proxy device to implement a communication connection with the user side. In this embodiment, the conference user sends a request to access the IP address of the media proxy device. Considering that the allocation of the IP address of the media proxy device directly affects the usage rate of the media proxy device, the allocation method provided in this application is used to reasonably allocate the IP address of the media proxy device to the conference user, which implements the reasonable use of the resource of the media proxy device, and implements load balancing of each media proxy device in the media proxy device set.

In the foregoing embodiment, when the computer device receives the service request sent by the user, the request access address is extracted from the service request, and the corresponding target service device is matched for the service request through the service request allocation method. Then, the request access address is modified to the target address corresponding to the target service device, to achieve the communication connection between different devices according to the target address, which makes it possible to execute the service device using the target service device, and improves the efficiency of processing the service request.

In an embodiment, the service request that needs to be processed is a conference connection request, and the service request allocation method further includes receiving a conference connection request, the conference connection request carrying an access request address. According to the service request allocation method, the target service device matching the conference connection request is determined, the target address corresponding to the target service device is acquired, the access request address is modified to the target address, and the conference connection request is allocated to the target service device corresponding to the target address, to indicate the target service data to perform the connection operation for the conference connection request.

Different conference connection requests are quite different. For example, a conference duration corresponding to some conference connection requests may be several hours, and a conference duration corresponding to other conference connection requests may be only a few minutes. In addition, the burr phenomenon of the conference connection request is serious. For example, the probability that the conference connection request is an hourly conference is relatively large. For example, there are a relatively large quantity of conference connection requests corresponding to the morning conference at 8 a.m. or 9 a.m. Based on the above problems, if it is necessary to re-count, using a conventional conference connection request allocation method, the idle resource of each service device in the service device set and update the idle resource of each service device in real time each time a conference connection request is received, a large calculation amount is caused and the system is unstable. In this application, the idle resource of each service device in the service device set is collected every N seconds, and all the service devices in the service device set are sorted according to the idle resource of each service device, the division of the service device subset is performed according to the sorting order, and the allocation weight of each service device subset is calculated. Accordingly, the conference connection request sent by the user is allocated to different service device subsets according to the allocation weight, and the conference connection request is allocated in the service device subset in a polling manner, which implements reasonable allocation for the conference connection request, and implements load balancing of the service device at the same time. Especially in the scenario where the usage of conference users varies greatly, the service devices with a similar idle resource are put into the same service device subset, allocation is performed according to the allocation weight among different service device subsets, and polling allocation is performed in the same service device subset. Accordingly, the calculation amount of the algorithm is reduced, that the allocation probabilities of the service device subsets with different allocation weight are different is implemented at the same time, and load balancing is achieved.

In addition, this application quantifies the idle resource of all the service devices in the service device set, and can support different types of service devices. The algorithm has a high scalability and can be deployed in a distributed manner, thereby improving the scalability of the service device. In addition, in this application, load balancing in conference scenarios is implemented efficiently (idle resources are calculated every N seconds), and the collection delay requirement for the idle resource in the current service device set is relatively low.

Figure 9:
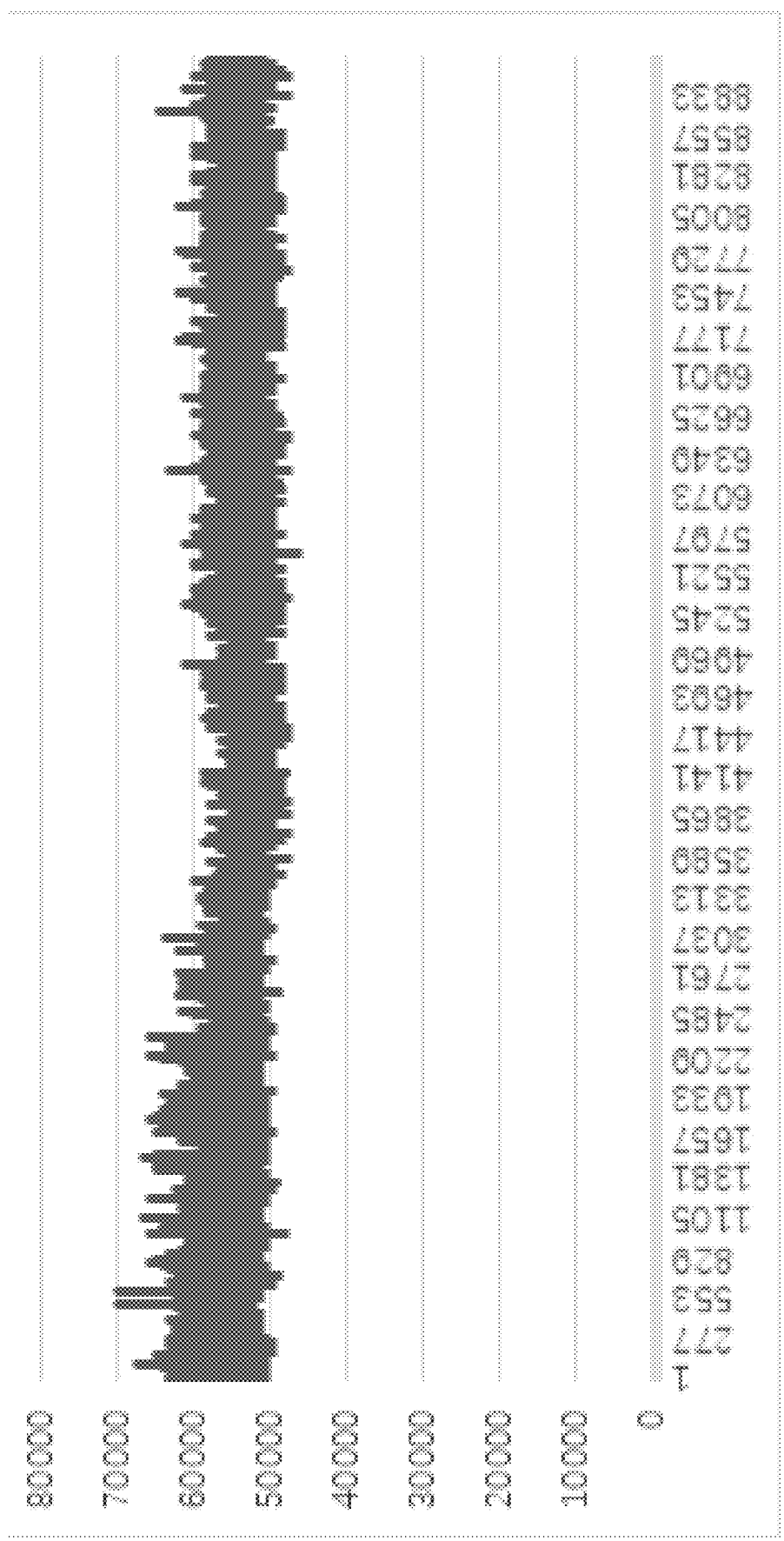
FIG. 9 is a schematic diagram of a resource usage rate corresponding to each service device when service request allocation is performed according to a service request allocation method in an embodiment.

FIG. 9 is a schematic diagram of a resource usage rate corresponding to each service device when service request allocation is performed according to a service request allocation method in an embodiment. In FIG. 9, the vertical coordinate is the allocation weight, and the horizontal coordinate is the device ID (1 to 8000) of the service device. The upper limit of the load usage rate of each service device is 10 W. It can be seen from FIG. 9 that the load usage rate of the service device in the service device set is distributed between 5 W and 7 W, which basically implements load balancing of the service device.

Applying the service request allocation method provided in this application, the computer device may execute the step of dividing the service devices into groups every N seconds, and count the current available resource information of the service device only once and calculate the allocation weight once within a time period, so that the allocation weight of each service device subset may be counted efficiently, and there is no need to recalculate the allocation weight each time the service request is allocated. Accordingly, the real-time requirement of collecting the current idle information of each service device in the service device set is reduced, and the reliability of the system is improved at the same time. In addition, this method may support service devices in different types and with different processing capabilities to simultaneously serve, and may further deploy the service devices in a distributed manner. Especially when the quantity of service requests is relatively large, the service device may be further horizontally expanded to improve the processing capability of the service device.

In an embodiment, the service request that needs to be processed includes a conference connection request, the service device includes a media proxy device, and a device resource of the service device includes at least one of a resource for implementing user access, a resource for implementing a virtual room application, and a network traffic resource.

This application further provides an application scenario, which applies the foregoing service request allocation method. In some embodiments, the application of the service request method in the application scenario is as follows:

The description is provided using an example in which the computer device is a route, the service request is a conference connection request, the service device set is a media proxy device set, and the service device is a media proxy device. In some embodiments, the route acquires valid resource information and current idle resource information of each media proxy device in the media proxy device set within a current time period, determines available resource information of each media proxy device according to a ratio of the valid resource information and the current idle resource information, and sorts the media proxy devices according to the available resource information. The route divides the media proxy devices into different groups according to a predetermined group division ratio, to obtain a plurality of media proxy device subsets corresponding to the current time period. And the route calculates an allocation weight of each media proxy device subset according to the available resource information of the media proxy device included in each media proxy device subset. The range of the allocation weight is 0 to 100, and the media proxy device subset with a greater allocation weight has a larger probability of being allocated with the conference connection request.

After receiving the conference connection request sent by the user side from the conference user within the current time period, the route randomly acquires a target allocation code in a range of 0 to 100. Then, the route determines a target media proxy device subset corresponding to the target allocation code according to an allocation weight interval in which the target allocation code falls, allocates the conference connection request to the target media proxy device subset, accesses media proxy devices in the target media proxy device subset in a polling manner, and uses a media proxy device that is polled in the current time as a target media proxy device for processing the service request. The route acquires a target address corresponding to the target media proxy device and sends the conference connection request to the target media proxy device according to the target address. After completing a service operation for the conference connection request, the target media proxy device transmits obtained operation data to the route through the target address corresponding to the target media proxy device. The route sends the operation data to the conference user, to complete a conference connection operation.

When the conference connection request in the current time period is completed, the route re-counts the current idle resource information of each media proxy device in the media proxy device set, and re-performs the division of the media proxy device subset according to the current idle resource information, to obtain a plurality of media proxy device subsets. Accordingly, a step of determining the target media proxy device is performed according to the redetermined media proxy device subset when a conference connection request is received within the next time period. The conference connection request is allocated in different media proxy device subsets according to the allocation weight, and the target media proxy device is determined by randomly polling in the target media proxy device subset, which is efficient, thereby improving the efficiency of allocating the conference connection request.

It is to be understood that steps in flowcharts of FIG. 2 to FIG. 7 are displayed in sequence based on indication of arrows, but the steps are not necessarily performed in sequence based on a sequence indicated by the arrows. Unless otherwise clearly specified in this specification, the steps are performed without any strict sequence limit, and may be performed in other sequences. In addition, at least some steps in FIG. 2 to FIG. 7 may include a plurality of steps or a plurality of stages. The steps or the stages are not necessarily performed at the same moment, and instead may be performed at different moments. The steps or the stages are not necessarily performed sequentially, and instead may be performed in turn or alternately with another step or at least some of steps or stages of another step.

Figure 10:
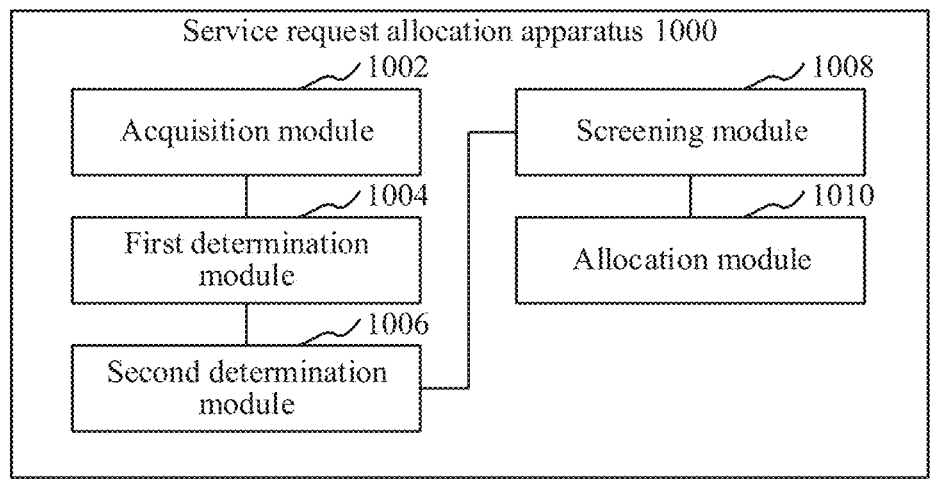
FIG. 10 is a structural block diagram of a service request allocation apparatus according to an embodiment.

In an embodiment, as shown in FIG. 10, a service request allocation apparatus 1000 is provided. The apparatus may use a software module or a hardware module, or a combination of the two to become a part of the computer device. The apparatus specifically includes: an acquisition module 1002, a first determination module 1004, a selecting module 1008, and an allocation module 1010.

The acquisition module 1002 is configured to acquire a service request that needs to be processed.

The first determination module 1004 is configured to determine a plurality of service device subsets obtained by dividing a service device set, the plurality of service device subsets being obtained by dividing service devices based on an idle resource of each service device in the service device set.

The second determination module 1006 is configured to determine a target service device subset that matches the service request according to an allocation weight corresponding to each service device subset.

The selecting module 1008 is configured to select a target service device from the target service device subset.

The allocation module 1010 is configured to allocate the service request to the target service device, the target service device being configured to perform a service operation corresponding to the allocated service request.

In an embodiment, the first determination module 1004 is further configured to: determine available resource information corresponding to each of more than one service device in the service device set within a current time period; sort each of the service devices according to the available resource information; and divide each sorted service device into a corresponding group according to a pre-determined group division ratio, the service devices belonging to a same group collectively constitute a service device subset.

In an embodiment, the first determination module 1004 is further configured to: determine valid resource information corresponding to each service device in the service device set; collect current idle resource information corresponding to each service device in the service device set within the current time period; and determine the available resource information corresponding to each of the service devices according to a comparison value between the current idle resource information and the valid resource information.

In an embodiment, the valid resource information includes a maximum quantity of accessible users, a maximum quantity of virtual rooms that are allowed to be applied for, a maximum value of incoming traffic, and a maximum value of outgoing traffic. The current idle resource information includes a quantity of currently accessible users, a quantity of currently accessible virtual rooms, a current idle value of incoming traffic, and a current idle value of outgoing traffic. The first determination module 1004 is further configured to: determine a first comparison value corresponding to each service device according to the quantity of currently accessible users and the maximum quantity of accessible users corresponding to each service device; determine a second comparison value corresponding to each service device according to the quantity of virtual rooms that are currently allowed to be applied for and the maximum quantity of virtual rooms that are allowed to be applied for corresponding to each service device; determine a third comparison value corresponding to each service device according to the current idle value of incoming traffic and the maximum value of incoming traffic corresponding to each service device; determine a fourth comparison value corresponding to each service device according to the current idle value of outgoing traffic and the maximum value of outgoing traffic corresponding to each service device; and use, for each service device in the service device set, a minimum value among the first comparison value, the second comparison value, the third comparison value, and the fourth comparison value corresponding to the corresponding service device as the available resource information corresponding to the corresponding service device.

In an embodiment, the service request allocation apparatus 1000 further includes a third determination module 1012. The third determination module 1012 is configured to: respectively determine a subset weight corresponding to each of the service device subsets according to the idle resource of each service device in each of the service device subsets; determine a total set weight corresponding to the service device set according to the subset weight corresponding to each of the service device subsets; and respectively determine an allocation weight corresponding to each service device subset according to a comparison value between the subset weight corresponding to each of the service device subsets and the total set weight.

In an embodiment, the second determination module 1006 is further configured to: randomly determine a target allocation code corresponding to the service request from an allocation code set, the allocation code set including allocation code subsets that correspond one-to-one to the plurality of service device subsets, and a quotient of a quantity of allocation codes of the allocation code subset and a total quantity of allocation codes of the allocation code set matching an allocation weight corresponding to a corresponding service device subset; determine a target allocation code subset to which the target allocation code belongs; and use the service device subset in the plurality of service device subsets that corresponds to the target allocation code subset as the target service device subset that matches the service request.

In an embodiment, the second determination module 1006 is further configured to: sort the plurality of allocation code subsets to obtain a sorting value corresponding to each allocation code subset; acquire a current sorting value of current polling; determining a pre-order sorting value sorted before the current sorting value, and determining a total quantity of pre-order allocation codes of each allocation code subset corresponding to the pre-order sorting value; use a difference between the target allocation code and the total quantity of pre-order allocation codes as a value to be compared; determine that the allocation code subset corresponding to the current sorting value is the target allocation code subset to which the target allocation code belongs, when the value to be compared is greater than zero and less than a quantity of allocation codes of the allocation code subset corresponding to the current sorting value; and otherwise, use a next sorting value subsequent to the current sorting value as a current sorting value of next polling, and return to the step of determining a pre-order sorting value sorted before the current sorting value and continue to perform the method.

In an embodiment, the selecting module 1008 is further configured to: determine a queuing order of each service device in the target service device subset; and use a service device that is currently polled when polling is performed according to the queuing order as the current target service device.

In an embodiment, the allocation module 1010 is further configured to acquire a target address corresponding to the target service device, and allocate the service request to the corresponding target service device according to the target address. A feedback module 1014 of the service request allocation apparatus is configured to: determine a request access address carried in the service request; receive operation data sent by the target service device and obtained when performing the service operation corresponding to the service request; and feed back the operation data through the request access address in response to the service request.

In an embodiment, the service request that needs to be processed includes a conference connection request, the service device includes a media proxy device, and a device resource of the service device includes at least one of a resource for implementing user access, a resource for implementing a virtual room application, and a network traffic resource.

For a specific limitation on the service request allocation apparatus, reference may be made to the limitation on the service request allocation method above. Details are not described herein again. The modules in the foregoing service request allocation apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

The service request allocation apparatus determines the plurality of service device subsets obtained by dividing the service device set, the plurality of service device subsets being obtained by dividing service devices based on the idle resource of more than one service devices in the service device set, so that each service device subset includes one or more service devices with a similar load condition. When the service request that needs to be processed is acquired, the target service device subset that matches the service request may be determined according to the allocation weight corresponding to each service device subset. Then, the service request may be allocated to the target service device in the target service device subset, to perform the corresponding service operation. Because the target service device subset includes the plurality of service devices, the quantity of service device subsets is much less than the quantity of service devices. By allocating the service request to the target service device subset first rather than directly to a specific service device, the calculation amount in the allocation process is reduced, and the efficiency of allocating the service request is improved. In addition, by allocating the service request to the corresponding target service device subset according to the allocation weight corresponding to each service device subset, reasonable allocation for the service request is implemented, thereby satisfying load balancing among the service device subsets. Accordingly, firstly, the service request is allocated to the target service device subset from a coarse-grained level with a direction of load balancing. Then, the service request is allocated to a target service device in the target service device subset. Accordingly, load balancing when the service request is allocated can be satisfied, and there is no need to perform a large quantity of load update calculations in real time, thereby greatly reducing the calculation amount and greatly improving the efficiency of allocating the service request.

In an embodiment, a computer device is provided. The computer device may be a routing device, and a diagram of an internal structure thereof may be shown in FIG. 11. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store data related to the service devices. The network interface of the computer device is configured to communicate with an external terminal through a network connection. The computer program is executed by the processor to implement a service request allocation method.

Figure 11:
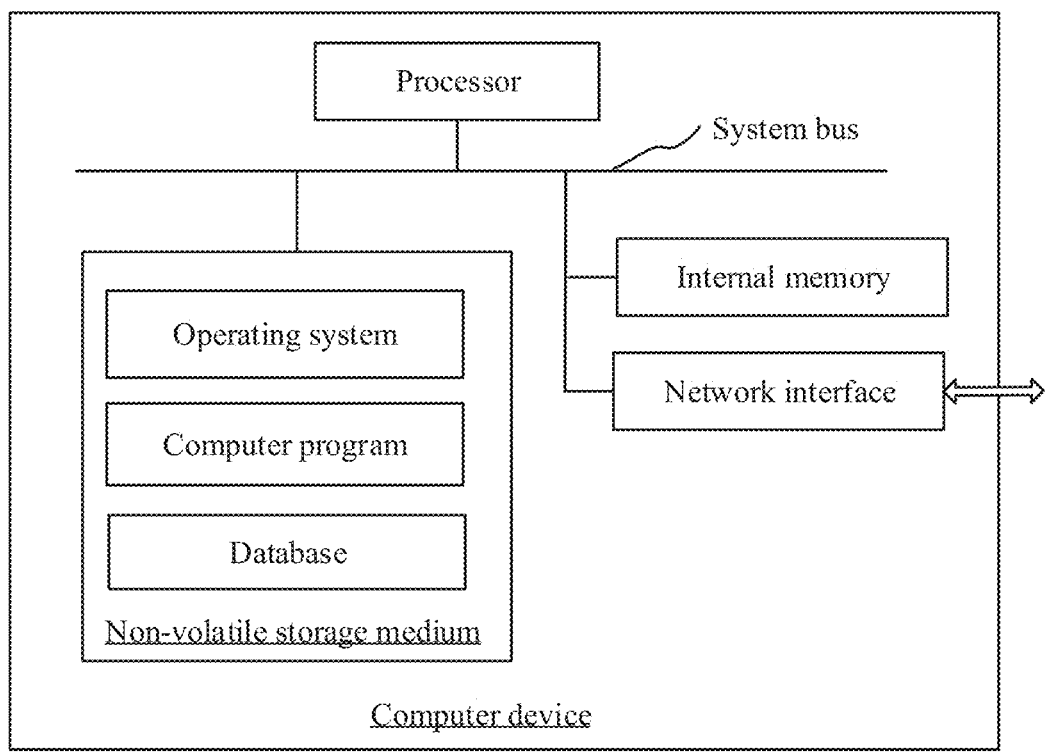
FIG. 11 is a diagram of an internal structure of a computer device according to an embodiment.

A person skilled in the art may understand that the structure shown in FIG. 11 is merely a block diagram of a part of a structure related to a solution in this application, and does not constitute a limitation to the computer device to which the solution of this application is applied. In some embodiments, the computer device may include more or fewer components than those shown in the drawings, or some components may be combined, or a different component arrangement may be used.

In an embodiment, a computer device is further provided, including a memory and one or more processors. The memory stores computer-readable instructions, and the computer-readable instructions, when executed by the one or more processors, cause the one or more processors to perform the steps in the foregoing method embodiments.

In an embodiment, one or more non-volatile readable storage mediums storing computer-readable instructions are provided. The computer-readable instructions, when executed by one or more processors, cause the one or more processors to perform the steps in the foregoing method embodiments.

In an embodiment, a computer program product or a computer program is provided. The computer program product or the computer program includes computer instructions, and the computer instructions are stored in a computer-readable storage medium. A processor of a computer device reads the computer instructions from the computer-readable storage medium, and the processor executes the computer instructions, to cause the computer device to perform the steps in the foregoing method embodiments.

A person of ordinary skill in the art may understand that all or some of the procedures of the methods in the foregoing embodiments may be implemented by a computer program instructing relevant hardware. The computer program may be stored in a non-volatile computer-readable storage medium. When the computer program is executed, the procedures of the foregoing method embodiments may be performed. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM may be in various forms, such as a static RAM (SRAM) or a dynamic RAM (DRAM).

What is claimed is:

1. A service request allocation method, performed by a computer device, the method comprising:
    receiving a service request that needs to be processed;
    dividing a service device set into a plurality of service device subsets, the plurality of service device subsets being grouped based on an idle resource of each service device in the service device set;
    randomly determining a target allocation code corresponding to the service request from an allocation code set, the allocation code set comprising allocation code subsets that correspond one-to-one to the plurality of service device subsets;
    sorting the plurality of allocation code subsets to obtain a sorting value corresponding to each allocation code subset;
    determining a target allocation code subset to which the target allocation code belongs based on polling the allocation code subsets corresponding to each sorting value sequentially from an initial sorting value;
    determining a service device subset in the plurality of service device subsets that corresponds to the target allocation code subset as a target service device subset that matches the service request;
    selecting a target service device from the target service device subset; and
    allocating the service request to the target service device, the target service device being configured to perform a service corresponding to the allocated service request.

2. The method according to claim 1, wherein the dividing a service device set into a plurality of service device subsets comprises:
    determining available resource information corresponding to each of more than one service device in the service device set within a current time period;
    sorting each of the service devices according to the available resource information; and
    dividing each sorted service device into a corresponding group according to a group division ratio, the service devices belonging to a same group collectively constitute a service device subset.

3. The method according to claim 2, wherein the determining available resource information corresponding to each of more than one service device in the service device set within a current time period comprises:
determining valid resource information corresponding to each service device in the service device set;
collecting current idle resource information corresponding to each service device in the service device set within the current time period; and
determining the available resource information corresponding to each of the service devices according to a comparison value between the current idle resource information and the valid resource information.

4. The method according to claim 3, wherein the valid resource information comprises a maximum quantity of accessible users, a maximum quantity of virtual rooms that are allowed to be applied for, a maximum value of incoming traffic, and a maximum value of outgoing traffic; the current idle resource information comprises a quantity of currently accessible users, a quantity of currently accessible virtual rooms, a current idle value of incoming traffic, and a current idle value of outgoing traffic; and
the determining the available resource information corresponding to each of the service devices according to a comparison value between the current idle resource information and the valid resource information comprises:
determining a first comparison value corresponding to each service device according to the quantity of currently accessible users and the maximum quantity of accessible users corresponding to each service device;
determining a second comparison value corresponding to each service device according to the quantity of virtual rooms that are currently allowed to be applied for and the maximum quantity of virtual rooms that are allowed to be applied for corresponding to each service device;
determining a third comparison value corresponding to each service device according to the current idle value of incoming traffic and the maximum value of incoming traffic corresponding to each service device;
determining a fourth comparison value corresponding to each service device according to the current idle value of outgoing traffic and the maximum value of outgoing traffic corresponding to each service device; and
using, for each service device in the service device set, a minimum value among the first comparison value, the second comparison value, the third comparison value, and the fourth comparison value corresponding to the corresponding service device as the available resource information corresponding to the corresponding service device.

5. The method according to claim 1, further comprising:
respectively determining a subset weight corresponding to each of the service device subsets according to the idle resource of each service device in each of the service device subsets;
determining a total set weight corresponding to the service device set according to the subset weight corresponding to each of the service device subsets; and
respectively determining an allocation weight corresponding to each service device subset according to a comparison value between the subset weight corresponding to each of the service device subsets and the total set weight.

6. The method according to claim 1, wherein
a quotient of a quantity of allocation codes of the allocation code subset and a total quantity of allocation codes of the allocation code set matching an allocation weight corresponding to a corresponding service device subset.

7. The method according to claim 6, wherein the determining the target allocation code subset to which the target allocation code belongs comprises:
obtaining a current sorting value of current polling;
determining a pre-order sorting value sorted before the current sorting value, and determining a total quantity of pre-order allocation codes of each allocation code subset corresponding to the pre-order sorting value;
using a difference between the target allocation code and the total quantity of pre-order allocation codes as a value to be compared;
determining that the allocation code subset corresponding to the current sorting value is the target allocation code subset to which the target allocation code belongs, when the value to be compared is greater than zero and less than a quantity of allocation codes of the allocation code subset corresponding to the current sorting value; and
using a next sorting value subsequent to the current sorting value as a current sorting value of next polling when the value to be compared is less than or equal to zero and more than or equal to a quantity of allocation codes of the allocation code subset corresponding to the current sorting value, and returning to the operation of determining a pre-order sorting value sorted before the current sorting value and continuing to perform the method.

8. The method according to claim 6, further comprising:
determining quantities of allocation codes in each of the allocation code subsets and a total quantity of allocation codes in the allocation code set, and determining a quotient of each of the quantities of allocation codes and the total quantity of allocation codes;
determining an allocation code subset weight of each allocation code subset according to the quotient of each of the quantities of allocation codes and the total quantity of allocation codes;
sorting the allocation code subsets according to the magnitude of the allocation code subset weight, and sorting the service device subsets according to the magnitude of the allocation weight; and
storing and mapping the allocation code subset and the service device subset having a same sorting order, to obtain a correspondence between the allocation code subset and the service device subset.

9. The method according to claim 1, wherein the selecting a target service device from the target service device subset comprises:
determining a queuing order of each service device in the target service device subset; and
using a service device that is currently polled when polling is performed according to the queuing order as the current target service device.

10. The method according to claim 9, wherein the determining a queuing order of each service device in the target service device subset comprises:
queuing the service devices according to the idle resource corresponding to each service device in the target service device subset, to obtain the queuing order of each service device in the target service device subset.

11. The method according to claim 1, wherein the allocating the service request to the target service device comprises:
acquiring a target address corresponding to the target service device, and allocating the service request to the corresponding target service device according to the target address; and the method further comprises:
determining a request access address carried in the service request;
receiving operation data sent by the target service device and obtained when performing the service corresponding to the service request; and
feeding back the operation data through the request access address in response to the service request.

12. The method according to claim 1, wherein the service request that needs to be processed comprises a conference connection request, the service device comprises a media proxy device, and a device resource of the service device comprises at least one of a resource for implementing user access, a resource for implementing a virtual room application, and a network traffic resource.

13. A computer device, comprising a memory and one or more processors, the memory storing computer-readable instructions, the computer-readable instructions, when executed by the one or more processors, causing the one or more processors to perform a service request allocation method comprising:
receiving a service request that needs to be processed;
dividing a service device set into a plurality of service device subsets, the plurality of service device subsets being grouped based on an idle resource of each service device in the service device set;
randomly determining a target allocation code corresponding to the service request from an allocation code set, the allocation code set comprising allocation code subsets that correspond one-to-one to the plurality of service device subsets;
sorting the plurality of allocation code subsets to obtain a sorting value corresponding to each allocation code subset;
determining a target allocation code subset to which the target allocation code belongs based on polling the allocation code subsets corresponding to each sorting value sequentially from an initial sorting value;
determining a service device subset in the plurality of service device subsets that corresponds to the target allocation code subset as a target service device subset that matches the service request;
selecting a target service device from the target service device subset; and
allocating the service request to the target service device, the target service device being configured to perform a service corresponding to the allocated service request.

14. The computer device according to claim 13, wherein the dividing a service device set into a plurality of service device subsets comprises:
determining available resource information corresponding to each of more than one service device in the service device set within a current time period;
sorting each of the service devices according to the available resource information; and
dividing each sorted service device into a corresponding group according to a group division ratio, the service devices belonging to a same group collectively constitute a service device subset.

15. The computer device according to claim 14, wherein the determining available resource information corresponding to each of more than one service device in the service device set within a current time period comprises:
determining valid resource information corresponding to each service device in the service device set;
collecting current idle resource information corresponding to each service device in the service device set within the current time period; and
determining the available resource information corresponding to each of the service devices according to a comparison value between the current idle resource information and the valid resource information.

16. The computer device according to claim 15, wherein the valid resource information comprises a maximum quantity of accessible users, a maximum quantity of virtual rooms that are allowed to be applied for, a maximum value of incoming traffic, and a maximum value of outgoing traffic; the current idle resource information comprises a quantity of currently accessible users, a quantity of currently accessible virtual rooms, a current idle value of incoming traffic, and a current idle value of outgoing traffic; and
the determining the available resource information corresponding to each of the service devices according to a comparison value between the current idle resource information and the valid resource information comprises:
determining a first comparison value corresponding to each service device according to the quantity of currently accessible users and the maximum quantity of accessible users corresponding to each service device;
determining a second comparison value corresponding to each service device according to the quantity of virtual rooms that are currently allowed to be applied for and the maximum quantity of virtual rooms that are allowed to be applied for corresponding to each service device;
determining a third comparison value corresponding to each service device according to the current idle value of incoming traffic and the maximum value of incoming traffic corresponding to each service device;
determining a fourth comparison value corresponding to each service device according to the current idle value of outgoing traffic and the maximum value of outgoing traffic corresponding to each service device; and
using, for each service device in the service device set, a minimum value among the first comparison value, the second comparison value, the third comparison value, and the fourth comparison value corresponding to the corresponding service device as the available resource information corresponding to the corresponding service device.

17. The computer device according to claim 13, the method further comprising:
respectively determining a subset weight corresponding to each of the service device subsets according to the idle resource of each service device in each of the service device subsets;
determining a total set weight corresponding to the service device set according to the subset weight corresponding to each of the service device subsets; and
respectively determining an allocation weight corresponding to each service device subset according to a comparison value between the subset weight corresponding to each of the service device subsets and the total set weight.

18. One or more non-transitory computer readable storage mediums, storing computer-readable instructions, the computer-readable instructions, when executed by one or more processors, causing the one or more processors to perform a service request allocation method comprising:

receiving a service request that needs to be processed;

dividing a service device set into a plurality of service device subsets, the plurality of service device subsets being grouped based on an idle resource of each service device in the service device set;

randomly determining a target allocation code corresponding to the service request from an allocation code set, the allocation code set comprising allocation code subsets that correspond one-to-one to the plurality of service device subsets;

sorting the plurality of allocation code subsets to obtain a sorting value corresponding to each allocation code subset;

determining a target allocation code subset to which the target allocation code belongs based on polling the allocation code subsets corresponding to each sorting value sequentially from an initial sorting value;

determining a service device subset in the plurality of service device subsets that corresponds to the target allocation code subset as a target service device subset that matches the service request;

selecting a target service device from the target service device subset; and allocating the service request to the target service device, the target service device being configured to perform a service corresponding to the allocated service request.

19. The computer readable storage mediums according to claim 18, wherein a quotient of a quantity of allocation codes of the allocation code subset and a total quantity of allocation codes of the allocation code set matching an allocation weight corresponding to a corresponding service device subset.

20. The computer readable storage mediums according to claim 19, wherein the determining a target allocation code subset to which the target allocation code belongs comprises:

obtaining a current sorting value of current polling;

determining a pre-order sorting value sorted before the current sorting value, and determining a total quantity of pre-order allocation codes of each allocation code subset corresponding to the pre-order sorting value;

using a difference between the target allocation code and the total quantity of pre-order allocation codes as a value to be compared;

determining that the allocation code subset corresponding to the current sorting value is the target allocation code subset to which the target allocation code belongs, when the value to be compared is greater than zero and less than a quantity of allocation codes of the allocation code subset corresponding to the current sorting value; and using a next sorting value subsequent to the current sorting value as a current sorting value of next polling when the value to be compared is less than or equal to zero and more than or equal to a quantity of allocation codes of the allocation code subset corresponding to the current sorting value, and returning to the operation of determining a pre-order sorting value sorted before the current sorting value and continuing to perform the method.

* * * * *